United States Patent [19]

Uber, III

[11] Patent Number: 4,970,391
[45] Date of Patent: * Nov. 13, 1990

[54] RADIATION DETECTOR WITH AN IONIZABLE GAS ATOP AN INTEGRATED CIRCUIT

[75] Inventor: Arthur E. Uber, III, Pittsburgh, Pa.

[73] Assignee: Medrad, Inc., Pittsburgh, Pa.

[ * ] Notice: The portion of the term of this patent subsequent to Feb. 14, 2006 has been disclaimed.

[21] Appl. No.: 310,198

[22] Filed: Feb. 13, 1989

Related U.S. Application Data

[63] Continuation of Ser. No. 7,195, Jan. 27, 1987, Pat. No. 4,804,847.

[51] Int. Cl.$^5$ ............................................. G01T 1/185
[52] U.S. Cl. ................................. 250/374; 250/385.1
[58] Field of Search ............... 250/386, 387, 388, 389, 250/374, 385.1

[56] References Cited

U.S. PATENT DOCUMENTS

| | | | |
|---|---|---|---|
| 3,366,790 | 1/1968 | Zagorites et al. | 250/385.1 |
| 4,342,913 | 8/1982 | Sheperd | 250/380 |
| 4,631,412 | 12/1986 | Turlej | 250/385.1 |
| 4,642,463 | 2/1987 | Thoms | 250/388 |
| 4,769,547 | 9/1988 | Uber, III | 250/386 |

*Primary Examiner*—Carolyn E. Fields
*Attorney, Agent, or Firm*—Fleit, Jacobson, Cohn, Price, Holman & Stern

[57] ABSTRACT

The radiation detector includes tissue equivalent bubbles of plastic defining volumes of gas to be ionized by radiation. One or more integrated circuit (ICs) are disposed below the volumes of gas and a collecting electrode on the IC is in direct contact with the gas. Circuitry for generating an electric field within the volume of gas moves the ions therein to the collecting electrode. The collecting electrode is part of an amplifying circuit disposed within the IC. The output from the amplifier is representative of the collected ions and therefore representative of the radiation. The signal from the amplifier is sent to an interface which conditions, buffers and stores the signal. The radiation dose and dose rate are computed in the interface. A communications section transfers that data from the radiation detector. A separate calibration and display unit calibrates the interface by controlling the conditioning of the signal. An area monitor and air monitor are further enhancements of the radiation detector. The radiation detector includes several circuitry arrangements for minimizing inaccuracies due to leakage currents to the collecting electrode from the amplifying circuit. Such circuitry arrangements include duplicate discharge and amplifying circuits not connected to a functioning collecting electrode; subtracting circuitry for subtracting a signal valued proportional to the leakage current; and a current source inducing current opposite in polarity to the leakage current.

66 Claims, 19 Drawing Sheets

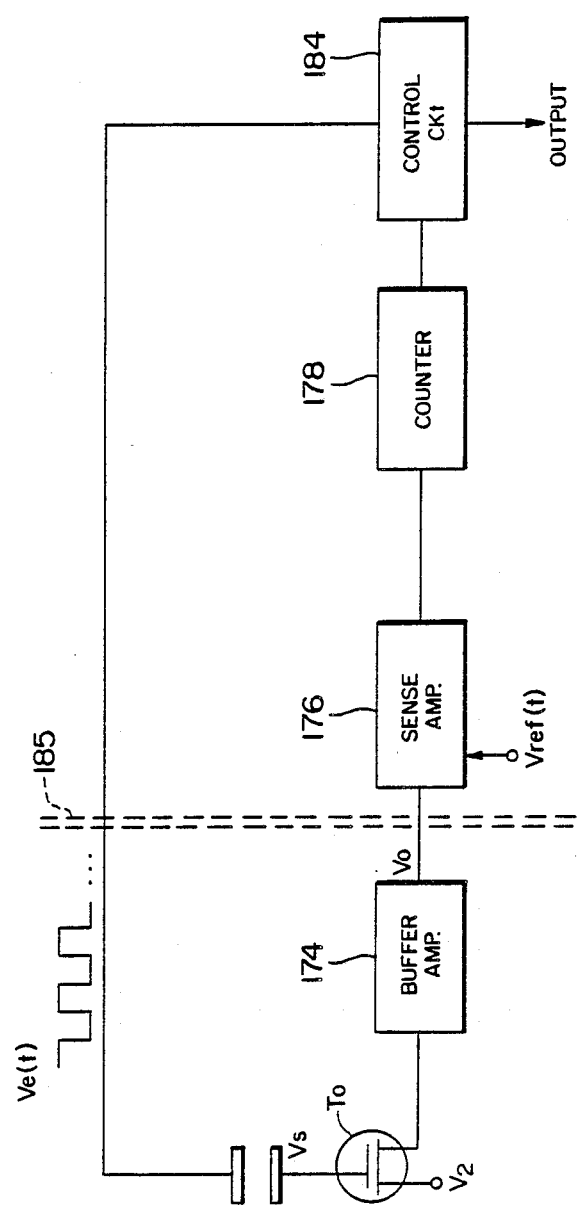

RADIATION DETECTOR WITH AN IONIZABLE GAS ATOP AN INTEGRATED CIRCUIT

This is a continuation of application Ser. No. 07/007,195, filed Jan. 27, 1987, now U.S. Pat. No. 4,804,847.

BACKGROUND OF THE INVENTION

Ionizing radiation presents a direct hazard to people; therefore, the measurement of radiation in environmental settings is important. The type of radiation monitor or detector used to measure the radiation depends upon the type of radiation, e.g., beta, alpha or X-ray and the environmental setting, e.g., an environmentally isolated laboratory, an open mine, a waste dump holding potentially hazardous material. The laboratory most likely requires a monitoring system with a continuous display and singular or multiple radiation detectors; the mine requires a moderately sensitive portable area detector; and the waste dump a relatively sensitive, directional detector.

D. A. Waechter et al. describe in an article entitled "New Generation Low Power Radiation Survey Instruments," a standard portable dosimeter (radiation monitor) system. The portable monitor consists of a Geiger-Muller tube (GM tube) with an event counter which records the number of ionizing events. There is a readout display and an audio alarm. The problem with the GM tube is that its response is not linear with the energy of the radiation so its accuracy varies with radiation energy, although it is useful for warning.

OBJECTS OF THE INVENTION

It is an object of this invention to provide a radiation detector which accurately measures both the total radiation exposure (total dose) and the rate of exposure (dose rate).

It is another object of the present invention to provide small, lightweight, integrated radiation detector assemblies which electronically record the degree of radiation exposure.

It is an additional object of the present invention to provide a radiation detector assembly which is separably mounted in a calibration and display unit capable of calibrating the assembly and displaying the radiation count or the dose rate.

It is an additional object of the present invention to provide a radiation monitor usable whenever ionizing radiation needs to be detected and measured, for example, area monitors, survey notes, radioactive gas detectors and quality assurance measures.

SUMMARY OF THE INVENTION

In one embodiment, the radiation detector includes a radiation detection assembly and a detector control and interface unit. The detection assembly is a plurality of detection subassemblies. Each subassembly includes a hemispheric bubble of electrically conductive tissue equivalent plastic which defines a volume of gas within the bubble. The gas is adapted to be ionized by radiation incident thereon. An integrated circuit (herein IC) is mounted below the volume of gas. A collecting electrode, on the surface of the IC, is in direct contact with the gas and collects ions resulting from the ionization of the gas by the radiation. The IC includes an amplifier that incorporates the collecting electrode. The detector control and interface unit conditions the signal from the amplifier and buffers that signal. In one embodiment, the unit includes a sensing amplifier that acts as a comparator, and a counter which is used to control the detection subassembly. The collecting electrode is a control gate for an amplifying transistor in the incorporated amplifier. An electric field within the volume of gas moves ions of one polarity toward the collecting electrode. The control gate/collecting electrode is biased to a predetermined level which changes due to the collected ions and therefore the output of the amplifying transistor is a signal representative of the amount of ions collected. The signal is applied to the interface and passed to the sense amplifier. When the conditioned signal passes a predetermined threshold, the counter is triggered and is incremented. Triggering the counter also commands a circuit to clear or restore a predetermined bias level to the control gate (the collecting electrode) of the amplifying transistor. The interface may additionally include a dose and dose rate computer, a memory and a communications section. In further embodiments, the voltage level (bias) of the collecting electrode is switched from a high and to a low level or vice versa upon receipt of a triggering pulse, thereby eliminating the need to electrically connect a voltage source to the collecting electrode to clear the accumulated charge.

Multiple electrodes can be used on the surface of the IC and configured either as collecting electrodes or biasing electrodes. In the latter configuration, the flux lines of the electric field extend between the biasing electrodes and the collecting electrodes. Otherwise, the electric field extends between the collecting electrodes and the interior surface of the conductive plastic defining the bubble of gas.

Another embodiment of the present invention utilizes several volumes of gas disposed above a single IC. In this setting, the IC has a plurality of collecting electrodes in direct contact with each volume of gas. In an additional embodiment, one volume of gas is displaced from atop the IC by a small distance. In this situation, the IC and the corresponding collecting electrode in the offset volume of gas are mounted on the substrate. The electrode is electrically coupled to the amplifier in the IC.

In other embodiments, the radiation detector mates with a calibration and display unit. Further, a plurality of radiation detectors can be configured as an air monitor or as an area monitor.

BRIEF DESCRIPTION OF THE DRAWINGS

The subject matter which is regarded as the invention is particularly pointed out and distinctly claimed in the concluding portion of the specification. The invention, however, together with further objects and advantages thereof, may best be understood by reference to the following description taken in conjunction with the accompanying drawings in which:

FIG. 19 illustrates a block diagram circuit that varies the voltage bias applied to the bias electrode thereby eliminating the switching transistor;

DETAILED DESCRIPTION

This invention relates generally to a radiation detector and particularly to a radiation detector with a volume of ionizable gas atop a solid-state integrated circuit.

Figure 1:
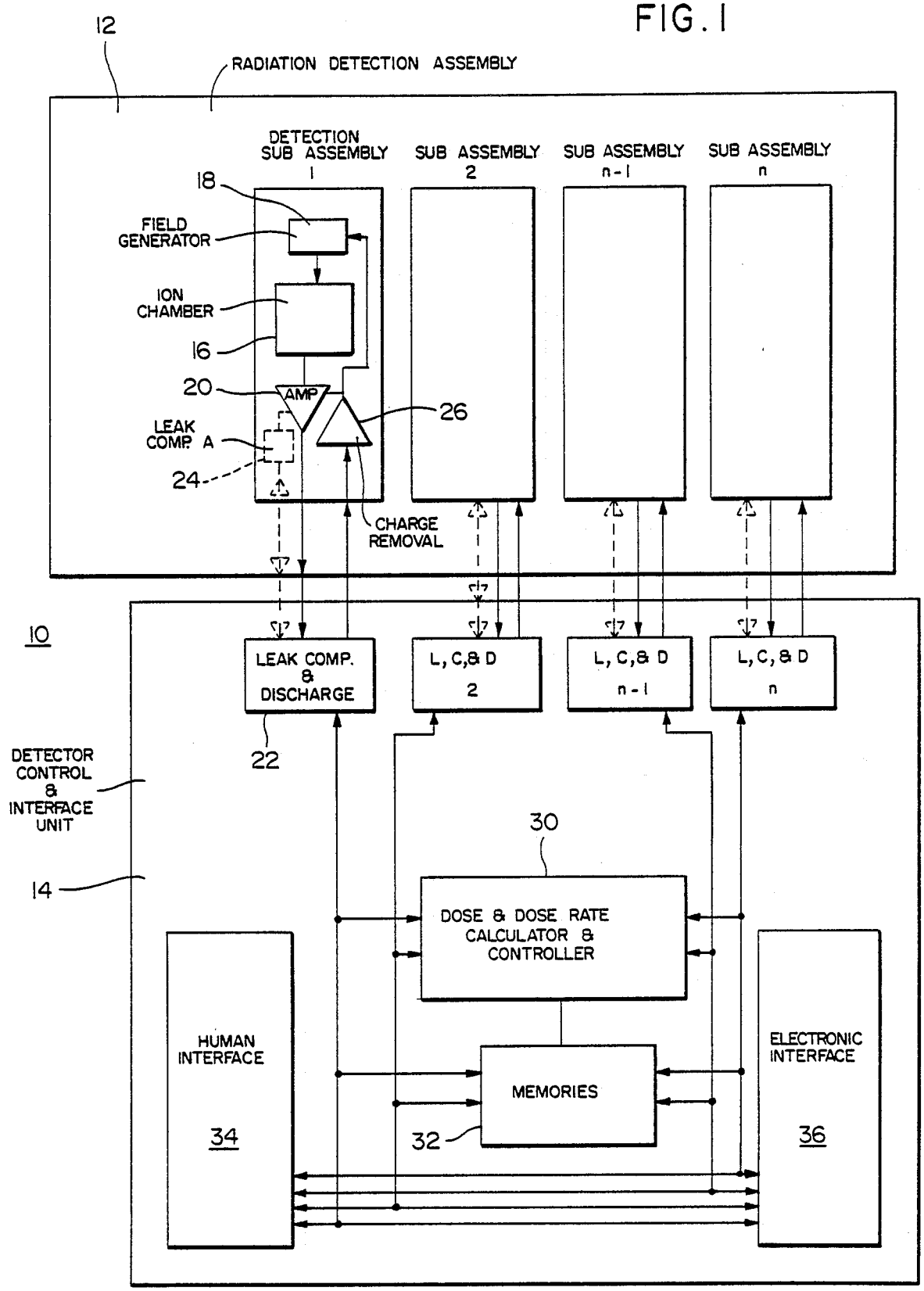
FIG. 1 illustrates a functional block diagram of the radiation detector.

FIG. 1 illustrates a functional block diagram of the radiation detector. Radiation detector 10 includes two general sections, a radiation detection assembly 12 and a detector control and interface unit 14. Radiation detection assembly 12 includes radiation detection subassemblies 1, 2 ... n−1, n. Each detection subassembly includes similar items as those depicted in detection subassembly 1. An ion chamber 16 holds a volume of ionizable gas atop an integrated circuit having a collecting or sensing electrode in direct contact with the gas. A field generator 18 develops an electrical field within the volume of gas and moves the ions in the gas created by radiation. The signal from the collecting electrode is applied to amplifier 20 and is subsequently applied to a leakage compensation and discharge controller$_1$ 22 in detector control and interface unit 14. The leakage compensation is discussed in detail below with respect to FIGS. 15 through 18. Alternatively, or in addition to, the detection subassembly 1 may include leakage compensation circuit A 24. Since the collecting electrode attracts ions in the gas due to the bias placed thereon, the subassembly includes charge removal device 26 that is coupled to the input of amplifier 20 and the input of field generator 18. The specific circuitry for charge removal device 26 and its operation is described later with respect to FIGS. 15 through 22.

Leakage compensation and discharge circuit$_1$ 22 controls charge removal device 26. In the detector control and interface unit 14, a leakage compensation and discharge circuit is associated with each radiation detection subassembly. Leakage compensation and discharge unit$_1$ 22 is coupled to dose and dose rate calculator and controller 30, memories 32, human interface 34 and electronic interface 36. The dose and dose rate calculator and controller generally determines the total amount of radiation the radiation detector has been subjected to as well as the rate at which the detector detects the radiation. These items are stored as radiation count data in the memories 32. The radiation detector may be embodied as CMOS integrated circuit elements to reduce power requirements and hence reduce the size of a power supply. The power can be internal to the detector and can be a battery; the power supply and the battery are not shown in FIG. 1. Various detection subassemblies and associated circuits in the detector control can be embodied as a plurality of integrated circuits (ICs). These ICs can be coupled to a microcomputer on a chip that functions as dose and dose rate calculator and controller 30, memories 32, human interface 34 and electronic interface 36. In another embodiment, a substantial portion of the detector can be embodied as a single IC. In general, the human interface 34 can include a display device which displays the total radiation count, i.e., the dose, or the dose rate. The human interface could also include actuable switches such that the dose and dose rate could be displayed upon command. Alternatively, those values could be continuously displayed. Further, the human interface may include alarm circuitry which would audibly, visually or otherwise (such as tactile or olfactory) provide an alarm to a human indicating that a certain dose threshold or a dose rate threshold has been exceeded. Electronic interface 36, in another preferred embodiment, could include a communications section linking a plurality of radiation detectors together. The electronic interface in combination with calculator and controller 30 and memories 32 could provide for the setting or programming of the dose threshold or dose rate threshold for the alarm. Calculator and controller 30 is the controller for interfaces 34 and 36, memories 32, and the other components in unit 14.

In another alternative embodiment, detection subassemblies 1, 2, n−1 and n could be constructed to sense different degrees of radiation. Detection subassembly 1 could detect significantly lower levels of radiation than subassembly 2 and calculator and controller 30 can be programmed to select the output from subassembly 2 only after the output of subassembly 1 reaches a predetermined value. In a general sense, detector control and interface unit 14 buffers the signal from radiation detection assembly 12 and conditions the output signal from those subassemblies as well as processes those output signals.

Figure 2A:
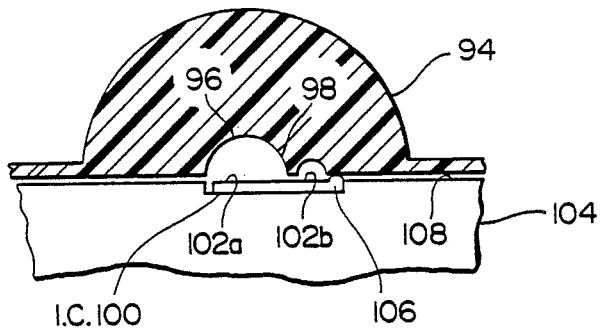
FIGS. 2A and 2B illustrate a partial cross-sectional view of two volumes of gas, or ion chambers, atop an integrated circuit.

FIG. 2A illustrates a partial cross-sectional view of a hemispheric plastic bubble 94 defining two volumes of gas, large volume 96 and small volume 98. Integrated circuit 100 is disposed immediately below gas volumes 96 and 98 and has surface portions 102a and 102b in direct contact with the substantially discrete volumes of gas. Although present, the electrodes on surfaces 102a and 102b are not illustrated in FIG. 2. Integrated circuit 100 is mounted on base 104. Connecting wire 106 extends between integrated circuit 100 and other components in the radiation detector located at other places on substrate base 104.

It is known to persons of ordinary skill in the art that the domestic and international government regulations require and/or recommend measuring dose at different tissue depths. Therefore, several ion chambers are included in the radiation detector. The geometry of each ion chamber can be altered to match the radiation response of the human body. Likewise, different wall materials can be used rather than tissue equivalent plastic. Also, different types of gas can be utilized to vary the detection of prescribed types or energies of radiation. The thickness of the ion chamber wall, if made from tissue equivalent plastic, determines the depth, into the human body, at which the radiation is being measured. An example of tissue equivalent plastic is a polyethylene based plastic with mixture of carbon black, calcium fluoride, and nitrogen containing plastics that approximately match the elemental characteristics (C, N, H and O) and effective atomic number of human muscle.

Gas volumes 96 and 98 are not illustrated as being completely isolated and further the plastic, which forms bubble 94, extends laterally along surface 108 of substrate 104. Precise isolation between volumes 96 and 98 is not required because ions generated by the radiation will move in each volume dependent upon an electric field established therein. Few if any ions pass between gas volume 96 and gas volume 98. The plastic is not illustrated as being specifically mounted on surface 108 of substrate 104 because of manufacturing constraints. Also, FIG. 2 is a magnified view of the ion chamber and the gap between plastic 94 and surface 108 may be exaggerated in that illustration.

Figure 2B:
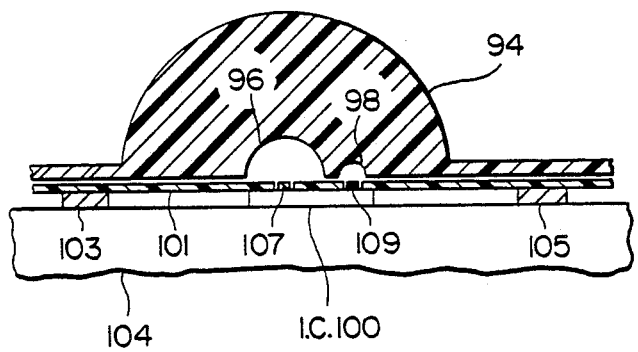

FIG. 2B illustrates IC 100 mounted on substrate 104. Additionally, a thin tissue equivalent plastic insert layer 101 is interposed between bubble plastic 94 and substrate 104 by mounts 103 and 105. Tissue equivalent plastic dots 107 and 109 are chosen as the collecting electrodes in order to obtain the proper electron equilibrium in the ion chamber. The geometry of the dots can be used to optimize the electric field. Layer 101 and dots 107 and 109 are an integral part of the IC surface.

Other collecting electrode materials may be used to gain different advantages.

Plastic bubble 94 is molded to define two gas volumes 96 and 98. In one preferred embodiment, all the electronics for the radiation detector reside on one substrate. The ICs, one of which is IC 100, are bonded directly to the substrate. The circuit can be injection molded into the bottom case of the radiation detector or be a rigid board or a flexible substrate which is attached to the bottom case. It is important that the integrated circuits align with the ion chambers on the top half of the case. Also, it is important that water does not leak into the radiation detector after it is assembled. An adhesive type epoxy may hold the two halves of the detector together or they can preferably be welded together. The thickness of the thinnest chamber wall is 0.003 inches; therefore, further protective structures may be required for that chamber holding that volume of gas.

Figure 3A:
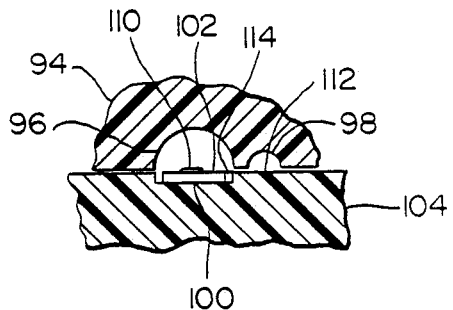
FIG. 3A illustrates another embodiment wherein one chamber is disposed proximate to but offset from the integrated circuit.

FIG. 3A illustrates another embodiment of the present invention wherein large gas volume 96 is immediately proximate and atop integrated circuit 100 but small gas volume 98 is disposed proximate to but offset from IC 100. Small volume 98 should be as close as possible to the IC to minimize capacitance.

An important feature of the present invention is the presence of the collecting electrode in direct contact with the gas volume, e.g., in FIG. 3A, electrode 110 in gas volume 96. The collecting electrode is on a surface segment of the IC. The surface segment is a portion of the structure which defines the volume of gas. However, the claims appended hereto include the concept that the collecting electrode may be bond pads, sense pads or electrically conductive, plastic structures bonded to, overlayed on or connected to the IC. In a strict sense, the collecting electrode may encompass all of the surface segment of the IC in contact with the gas. In any case, the IC is in close proximity to the volume of gas and in a preferred embodiment is immediately below the volume of gas. A protective covering, a nonconductive layer, or other structures placed on the surface of the IC, exclusive of the surface portion having the collecting electrode thereon, is encompassed by the use of the term "integrated circuit element" in the claims.

Returning to FIG. 3, collecting electrode 110 (the size of which is exaggerated in FIG. 3A) is on surface 102 of integrated circuit 100 and collects the ions produced by the radiation within gas volume 96. With respect to smaller gas volume 98, collecting electrode 112 is disposed on substrate 104. In a similar fashion to collecting electrode 110, collecting electrode 112 is in direct contact with the potentially ionized gas in gas volume 98. Coupling wire 114 electrically couples collecting electrode 112 to appropriate electronics in integrated circuit 100.

Figure 3B:
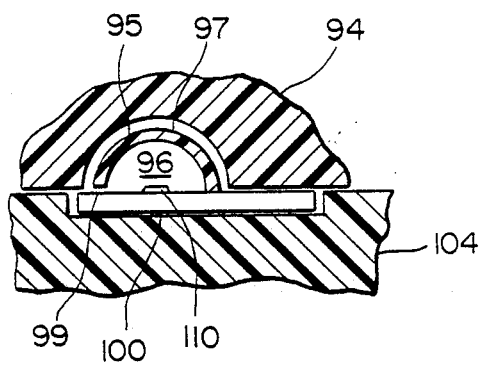
FIG. 3B illustrates an embodiment wherein two ion chambers are concentric and both are disposed atop the integrated circuit.

FIG. 3B shows an embodiment wherein two ion chambers or gas volumes 96 and 97 are concentric and both are disposed atop IC 100. The lower gas volume 96 is a low dose rate ion chamber and chamber or volume 97 is the high dose rate chamber. The volumes are physically separated by barrier wall 95. Gas is capable of passing between volumes 96 and 97 via passage 99. In one embodiment, barrier wall 95 is an electrically insulating plastic support having on its radially outer surface a collecting electrode structure (not shown but may be a layer of conductive plastic) for the high dose chamber or volume 97. In that embodiment, the radially inner surface of wall 95 includes a biasing or counter electrode, which is described in detail later with respect to the electric field generating means, for the low dose chamber or volume 96. In another embodiment, wall 95 is not made of electrically insulating material but is an electrically conductive plastic material such that the low dose rate counter electrode and the high dose rate collecting electrode are the same entity. As will be described later, control circuitry selects the effective range of the detector subassemblies by selecting which chamber is being monitored. In FIG. 3B, the high dose rate chamber (volume 97) has a more uniform electric field.

Figure 4:
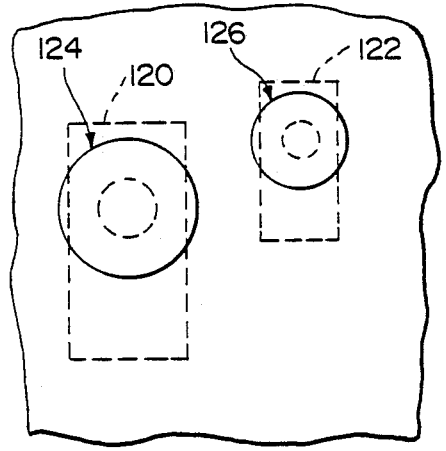
FIG. 4 illustrates a cutaway top view of an embodiment of the present invention showing ion chambers atop two integrated circuit elements.

FIG. 4 illustrates an alternative embodiment of the present invention showing integrated circuits 120 and 122 associated with ion chambers 124 and 126, respectively. Only a surface segment of each IC is proximate the respective volume.

Figure 5:
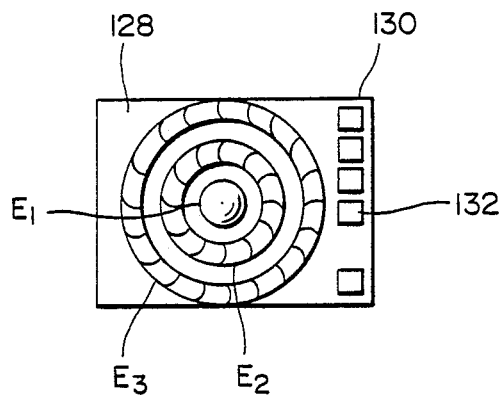
FIG. 5 illustrates the integrated circuit having surface electrodes $E_1$, $E_2$ and $E_3$.

FIG. 5 illustrates the top surface 128 of an integrated circuit 130. Bond pads 132 are illustrated along the right-hand portion of integrated circuit 130. These bond pads provide electrical contacts to the integrated circuit. On surface 128, electrodes $E_1$, $E_2$ and $E_3$ are illustrated as being concentric.

Figure 6:
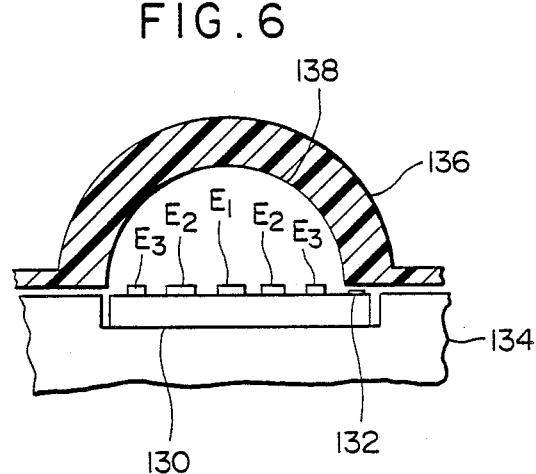
FIG. 6 illustrates the cross-sectional view of the ion chamber with multiple electrodes $E_1$, $E_2$ and $E_3$ in direct contact with the gas in the chamber.

FIG. 6 is a cross-sectional view of integrated circuit 130 which has been mounted on base 134 and below an ion chamber. Plastic bubble 136 defines gas volume 138. Electrodes $E_1$, $E_2$ and $E_3$ are in direct contact with the gas in gas volume 138.

Figure 7A:
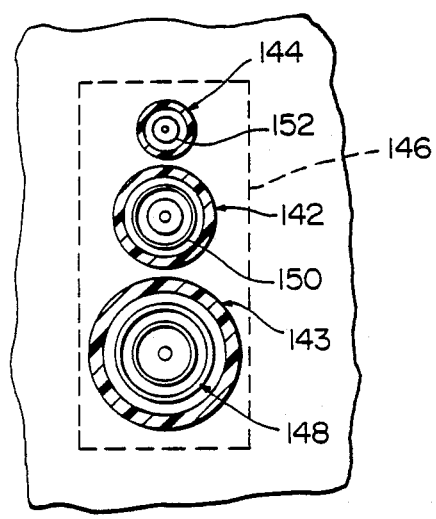
FIGS. 7A, 7B and 7C illustrate respectively multiple ion chambers per IC and multiple chambers each having a corresponding IC.
Figure 7B:
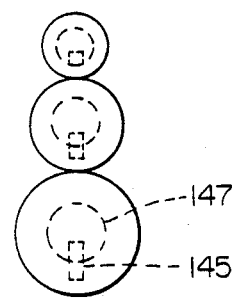
Figure 7C:
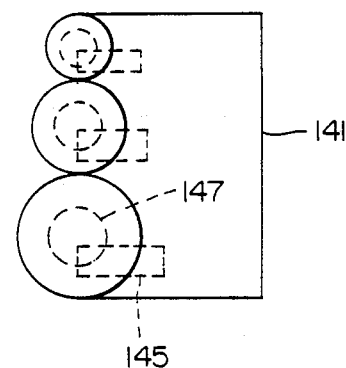

FIG. 7A shows a further embodiment of the present invention utilizing multiple ion chambers 140, 142 and 144 disposed atop integrated circuit 146. Ion chambers 140, 142 and 144 include electrode sets 148, 150 and 152, respectively. FIGS. 7B and 7C show a "snowman" configuration. The "snowman" configuration places the IC or a corner thereof into a fully spherical ion chamber. See IC 145 partially exposed to chamber 147 in FIG. 78. This gives almost $4\pi$ uniform detection. The spherical volume inside the inner wall defining chamber 147 is filled with gas. The corner (or edge of the IC if a single IC is exposed to all the chambers) of the IC would have an appropriate (probably spherical) electrode glued to it to collect ions. Thus, the angular response is uniform except when the radiation passes through the case in the black or from one ion chamber to the other. FIG. 7C shows plastic case 141, capable of holding batteries and other components and IC 145 extending beyond the outer wall of the bubble defining chamber 147.

Figure 8:
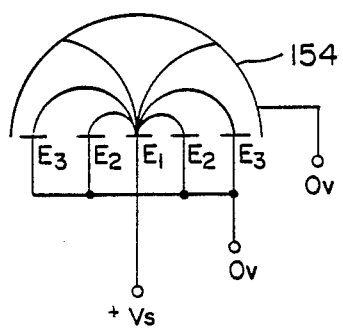
FIGS. 8, 9 and 10 schematically illustrate the electric field configurations with multiple electrodes in an ion chamber.
Figure 9:
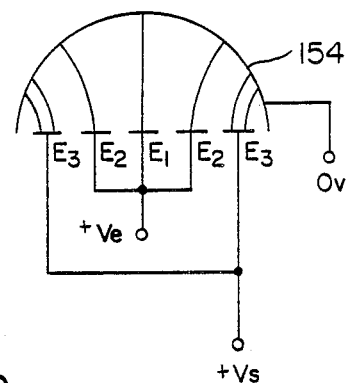
Figure 10:
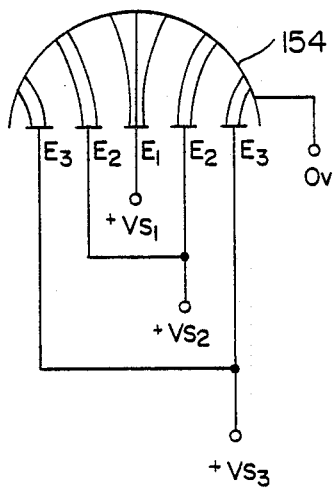

In order to efficiently collect ions within the gas volume, an electric field is generated therein such that the ions move in accordance with the electric field. In FIGS. 8, 9 and 10, flux lines are illustrated as intersecting with and/or extending from the electrodes. In general, by controlling the electric field, different regions of the gas volume can be swept or sensed by the electronics in the radiation detector. In the figures, the semicircular line 154 represents the interior surface of the plastic bubble of the ion chamber. $V_s$ is the sensing voltage and usually designates the collecting electrode; 0 v represents a grounded element; and $V_{s1}$, $V_{s2}$ and $V_{s3}$ represent different collecting electrodes set at different predetermined voltages.

In FIG. 8, electrode $E_1$ is the collecting electrode and is set at voltage $+V_s$. It is to be understood that the voltages illustrated and discussed herein are only exemplary and any discrete voltage levels can be used in place of the described and illustrated voltages. For example, rather than having a positive voltage at the collecting electrode, a negative voltage can be applied thereto. In that case, positive ions are collected at the collecting electrode rather than negative ions as discussed with respect to a $+V_s$ at the collecting electrode. Also, the 0 v could be any internal ground voltage other than zero volts which is designated as ground for the radiation detector.

In FIG. 8, electrode $E_1$ is the collecting electrode and is electrically biased to predetermined level $+V_s$. $V_s$ implies that this electrode is connected to a sensing circuit. The voltages $E_n$ imply connection to a voltage source with no measurement of collected charge being done. Electrodes $E_2$, and $E_3$ operate as biasing electrodes and are at 0 v. The one end of the flux lines of the electric field in FIG. 8 intersects collecting electrode $E_1$ and the other end intersects biasing electrodes $E_2$, and $E_3$. Also, since interior surface 154 will be typically grounded and since the plastic is conductive in nature, the electric field does extend to that interior surface. In this situation, when ions are generated in the volume of gas, negative ions will move towards collecting electrode $E_1$ due to the positive voltage level thereon and voltage $V_s$ will change, although the change may be minute, due to the accumulation of charge on electrode $E_1$. In order to obtain the electric field, the radiation detection subassembly includes means for generating the electric field. The strength of the electric field generally depends upon the voltage differential between the collecting electrode and another element within or without the volume of gas. Therefore, the strength of the electric field can be varied by changing the voltage differential, at least in FIG. 8, between electrode $E_1$ and electrodes $E_2$ and $E_3$. By applying a lower voltage to electrodes $E_2$ and $E_3$, the electric field within the volume of gas would increase. Similarly, by raising the voltage $V_s$ on collecting electrode $E_1$, the electric field increases.

In FIG. 9, interior surface 154 is grounded at 0 v, electrodes $E_1$ and $E_2$ are biased to voltage $+V_e$ and electrode $E_3$ is selected as the collecting electrode and is biased to $+V_s$. Since electrode $E_3$ is selected as the collecting electrode, the region swept is that region between electrode $E_3$ and surface 154 and is limited to the radially outer sectors of the volume. A complex conically cylindrically symmetric region is therefore swept.

In FIG. 10, any one of electrodes $E_1$, $E_2$ and $E_3$ can be the collecting electrode since $V_{s1}$ need not equal $V_{s2}$ or $V_{s3}$.

The means for generating the electric field need not be a battery. It can be two dissimilar materials which are physically and electrically connected at one end. For example, if the ends of a piece of copper and a piece of steel are joined, a voltage develops across the free ends of the copper and steel due to the work function difference between the different materials. This voltage differential may be sufficient to create the electric field for the IC dosimeter. Particularly, a gold plate or element and a carbon based plastic may be utilized to generate an electric field in this fashion due to the work function between gold and the carbon based plastic. Also, the biasing electrodes do not have to be exposed to the gas (excepting the collecting or sensing electrodes) since a field can be developed by conductors either within the IC or within the hemispheric bubble defining the volume of gas.

In operation, the radiation interacts with the gas in the ion chamber generating ions which move in the electric field. The ions of one polarity are collected on the exposed collecting electrode and the charge signal therefrom is amplified. If the collecting electrode is biased to a positive voltage with respect to the other electrodes, negative ions will be attracted and the voltage $+V_s$ will decrease based upon the amount of collected ions. The number of ions generated is proportional to the dose received. Ideally, all the ions generated are collected. The gas in the chambers should be under a slight pressure to provide some crush resistance when thin covers are used for the detection of beta particles. The choice of gas is determined by the energy response desired. Air, nitrogen, argon or tissue equivalent gas are possibilities. The use of air would result in the radiation being measured in Roentgens (R). Tissue equivalent gas measures radiation in rad (radiation absorbed dose) or Gy (gray unit which equals 100 rads).

The ion chamber performance is not ideal. The greater the radiation dose rate, the greater the number of ions generated. However, for finite electric fields, the ions are not collected instantly, so the concentration of ions in the gas increases with increasing dose rate. This results in some of the positive ions recombining with negative ions. These ions cancel and are not collected by the electrodes. Thus, the charge collected is decreased by this recombination and the measurement is no longer proportional to the dose received.

The minimum size of the ion chamber is determined by the minimum dose rate to be reliably detected. The dose rate permissible in an unrestricted area, an area which is classified as unrestricted by government regulations, is 2 mR/hr. A reasonable charge sensitivity for an integrated circuit amplifier is 1000 electrons since engineering literature describes an amplifier that can sense 1 mv with an input capacity of $1 \times 10^{-14}$F. Using the definition of 1 mR as being the amount of radiation required to generate 2000 ion pairs/mm$^3$, a volume of 180 mm$^3$ would average one pulse every five seconds at a dose of 2 mR/hr.

The shape of the ion chamber is controlled by the conflicting desires to have as high an electric field as possible and as low a capacitance as possible. The higher the electric field, the faster the ions move and higher the dose rate which can be accurately monitored. The lower the capacitance, the smaller the minimum charge and hence the smaller the dose which can be measured. A large area parallel plate arrangement could give the highest field. Concentric spherical surfaces would give a low capacitance. As mentioned above, at high dose rates, recombination occurs.

Different ion chambers and measurement circuits can accurately measure different dose rates. In certain situations, monitoring needs to occur over a wide range of dose rates, such as a survey instrument, or an area monitor which must take measurements during an accident as well as normal times. Or, some information about the radiation dose as a function of energy may be needed so several ion chambers are needed. The high dose rate chamber would be significantly smaller and have a higher field than the low dose rate chamber. For the high dose rate chamber, the collecting electrode need not be directly attached to the integrated circuit as illustrated in FIG. 3. The added capacitance of connecting wire 114 can be tolerated because ion chamber 98 does not need to be sensitive to miniscule doses. The control electronics in the detector control and interface unit 14 monitor the dose rate from each detection subassembly and use the chamber which is most accurate.

Alternatively, two or more electrodes in one ion chamber can be used. By changing the voltages applied to these electrodes, the volume swept by the collecting field can be changed. Examples of these are illustrated in FIGS. 8, 9 and 10. There are an unlimited number of electrode configurations with various advantages. FIG. 8 shows the bias applied when measuring a low dose rate. All charge is collected at center electrode $E_1$. Charge is collected from the total volume. FIG. 9 shows the bias conditions for which charge is measured in a smaller, high field, volume. In FIG. 10, the collecting electrode and hence the volume swept can be selected.

Figure 11:
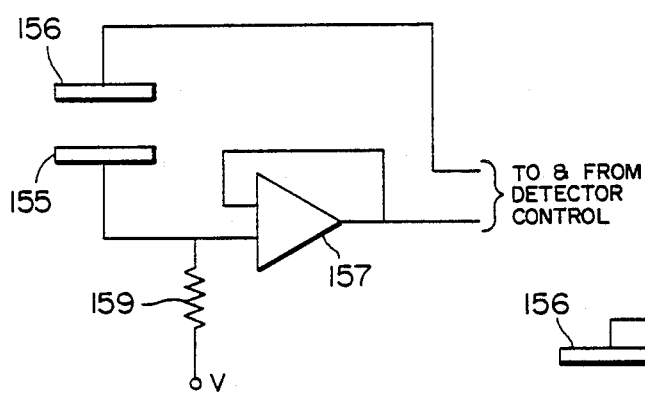
FIGS. 11 and 12 illustrate circuits, in block diagram form, which measure the voltage of the sensing or collecting electrode.
Figure 12:
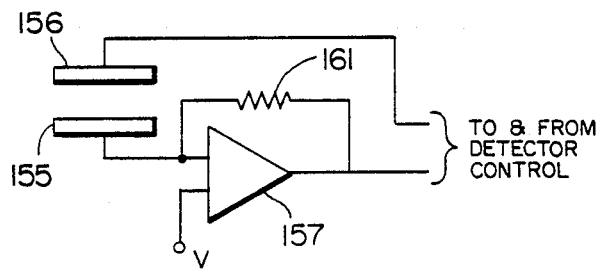

FIGS. 11 and 12 illustrate circuits which measure the current to the collecting electrode 155 rather than the charge due to the collection of ions on that electrode. In FIG. 11, one input of amplifier 157 is biased to a voltage level dependent upon the power source $V^1$ and the value of resistor 159. The voltage changes due to the voltage drop across resistor 159 as the collected current is conducted through it. As is discussed in detail later, electrode 156 is a bias electrode that establishes the electric field in the volume of gas. In FIG. 12, resistor 161 provides a feedback voltage signal that is a basis for comparing the signal obtained from collecting electrode 155.

Figure 13:
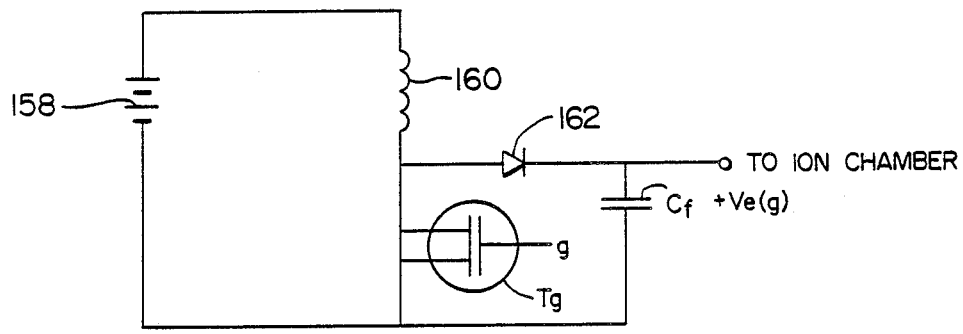
FIG. 13 illustrates a flyback circuit which applies an increased voltage bias to a bias electrode.
Figure 14:
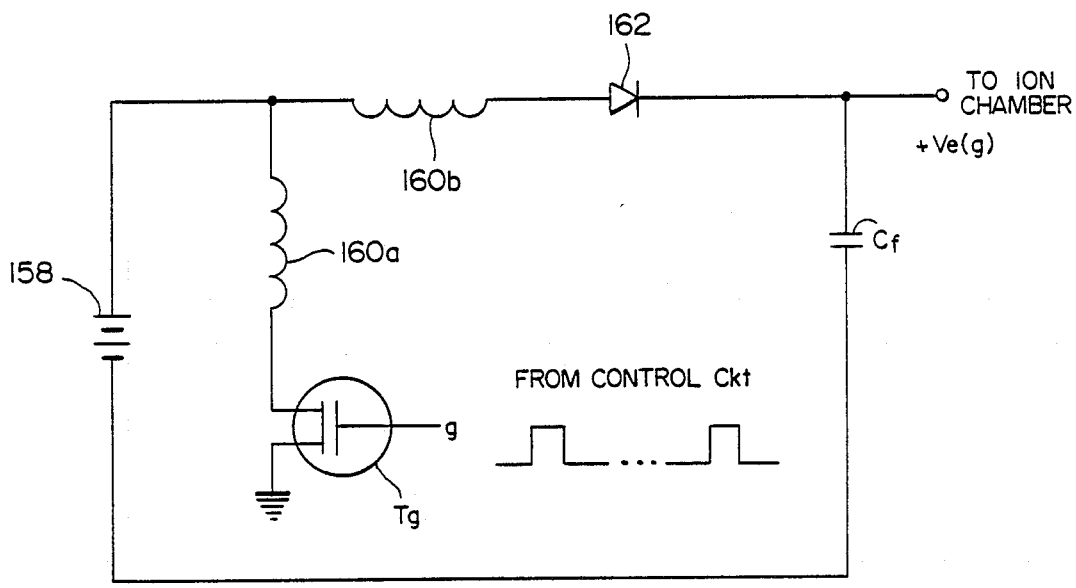
FIG. 14 illustrates another flyback circuit.

Since the electric field is controlled in part by the voltage applied to a particular electrode, FIGS. 13 and 14 illustrate flyback circuits to increase the voltage levels and hence increase the electric field. The use of flyback circuits permits bias control circuitry for a particular ion chamber to increase the bias field $V_{e(g)}$ (depicted as $V_e$ in FIG. 9) as the dose rate increases. For example, for every factor of 10 increase in the dose rate, the bias is increased by the square root of 10 to maintain recombination losses at the same level. The flyback transformers 160, 160a and 160b are triggered via transistor $T_g$ after the dose rate exceeds some rate threshold. The charge on capacitor $C_f$ is increased due to the release of energy from inductors 160 and 160a when $T_g$ is turned off. If the flyback transformer is not being used, the battery voltage is applied to $V_e$ with substantially no voltage loss other than the diode. The detector control in FIG. 1 can be configured to control the flyback circuits in this manner. This power circuitry is part of the detector control as is any required voltage regulation circuitry.

Figure 15:
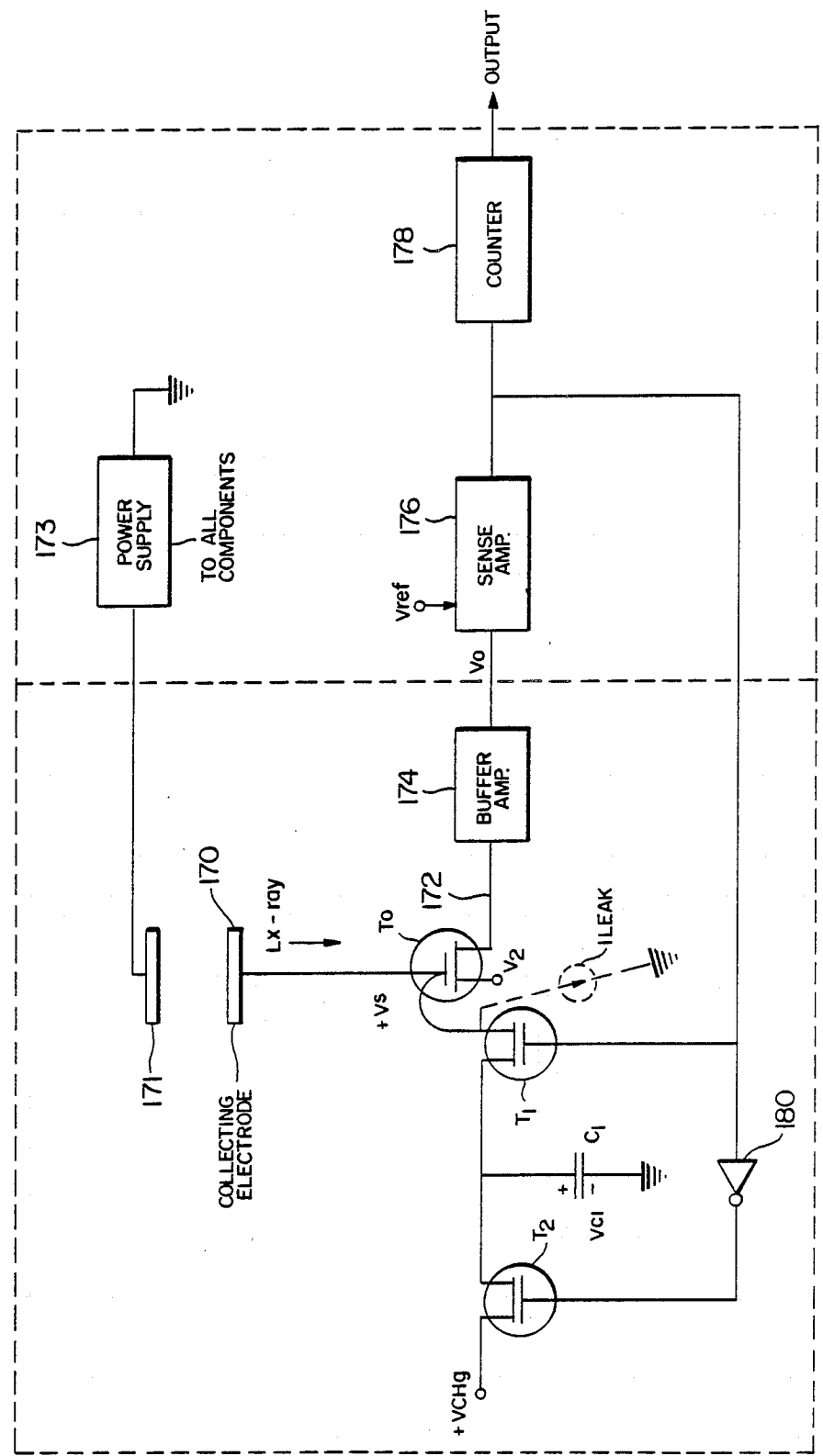
FIG. 15 illustrates a block diagram circuit for measuring the amount of radiation and counting the radiation dose.

FIGS. 15, 16, 17, 18, 19, 20 and 21 illustrate electrical block diagrams for the radiation detector. In FIG. 15, collecting electrode 170 is electrically biased to predetermined voltage level $V_s$. Bias electrode 171 establishes the electric field in the gas and is coupled to power supply 173. The dashed box 175 on the right indicates that those components are part of one radiation subassembly in FIG. 1. The dashed box 177 indicates components considered part of detector control and interface unit 14 in FIG. 1.

The collecting electrode is exposed to the volume of gas. The collecting electrode is also the control gate for amplifying transistor $T_0$, i.e., the collecting electrode is "incorporated" into the amplifier embodied by transistor $T_0$. The source of amplifying transistor $T_0$ is coupled to voltage $V_2$ and the drain of the amplifying transistor places a signal on line 172 representative of the amount of accumulated charges on the electrode and hence the radiation sensed by the detector subassembly. Buffer amplifier 174 isolates amplifying transistor $T_0$ from the rest of the circuitry and amplifies $T_0$'s output. $V_0$ is applied to sense amplifier 176. Sense amplifier 176 determines when the $V_0$ drops below a predetermined threshold $V_{ref}$ and generates trigger signal for counter 178. The trigger signal is also applied as a clearing control signal to a circuit which restores voltage $V_s$ to the collecting electrode or clears the accumulated charge from the electrode. If $V_s$ is a positive voltage with respect to the voltage on 171, negative ions will be attracted to collecting electrode 170 and voltage $V_0$ will fall dependent upon the accumulated charge. When $V_0$ falls below $V_{ref}$, sense amplifier 176 triggers counter 178.

Switching transistor $T_1$ applies a clearing voltage $V_{cl}$ to the control gate of amplifying transistor $T_0$. Clearing voltage $V_{cl}$ is developed across capacitor C1. Switching transistor $T_1$ is turned on by the clear control signal, i.e., the trigger signal, from sense amp 176 and thereafter couples capacitor C1 to the control gate of amplifying transistor $T_0$. During the trigger pulse, inverter 180 turns second switching transistor $T_2$ off and therefore isolates $V_{chg}$ from capacitor C1. When the trigger signal is removed, second switching transistor $T_2$ is turned on and capacitor C1 is charged by voltage $V_{chg}$. It is recommended that transistors $T_1$ and $T_2$ do not conduct at the same time. In this sense, the turn off time of the transistors must be quick and the turn on time must be slow.

In one embodiment, transistors $T_0$, $T_1$ and $T_2$ as well as buffer amplifier 174, sense amplifier 176, counter 178 and capacitor C1 are all disposed within the integrated circuit. The buffer and sense amplifiers may be combined. Other data processing components in the detector control and interface unit are downstream of counter 178 and may or may not be on the same IC. Collecting electrode 170 is directly exposed to the volume of gas and may be embodied as a sense pad which is placed above a conductive channel running internally into the integrated circuit element. The sense pad may be larger than the internal conductive channel because the sense pad can be spread over a top layer of insulation on the surface of the integrated circuit. The precise construction of an integrated circuit having these electrical components is known to persons of ordinary skill in the art. CMOS technology can be utilized to obtain the low power detector described herein.

Although these components are constructed as a single IC, their function corresponds to the functional block diagram in FIG. 1 as follows: sense amp 176 is part of amplifier 20; counter 178 corresponds to part of calculator and controller 30, transistors $T_1$ and $T_2$ and associated circuitry correspond to charge removal device 26. Counter 178 can be reset or re-zeroed on a periodic clock signal from computer 30. Alternatively, the device control and interface unit could operate on purely analog signals from the subassemblies rather than digital signals. As is described in detail below, the charge removal, the electric field generation and leakage compensation are all interrelated.

The use of switching transistor $T_1$ to provide a clearing voltage ($V_{cl}$) to the control gate of amplifying transistor $T_0$ presents a problem regarding the current leakage, ILEAK, from the transistor diffusion to the IC substrate. The current leakage is designated by dashed lines as ILEAK in FIG. 15 from the integrated circuit substrate to the drain of switching transistor $T_1$. This current leakage ILEAK will be sensed as an accumulated charge and hence a dose. A rough calculation indicates that this leakage could cause a pulse every eight seconds. For a 0.18 $cm^3$ chamber, this gives a background reading of radiation of 1.25 mR/hr which is unacceptable. The effect of leakage should be less than 1 mR/day. Corrective measures for minimizing the effect of ILEAK are discussed later.

A person of ordinary skill in the art recognizes that the voltage levels discussed with respect to FIG. 15 could be reversed. In that situation, positive ions would be attracted to the collecting electrode and amplifying transistor $T_0$ would either turn on at a certain voltage level $V_s$ or simply amplify the voltage $V_s$ based upon the accumulated charge. In that situation, voltage $V_0$ would steadily increase and sense amp 176 would provide a trigger when voltage $V_0$ exceeds reference voltage $V_{ref}$. Capacitor C1 would then discharge the accumulated charge from the gate of transistor $T_0$ and capacitor C1 would then discharge via transistor $T_2$ to the voltage source. Also, the buffer amp and sense amp could be inverting or non-inverting with compensation made elsewhere in the circuit.

Figure 16:
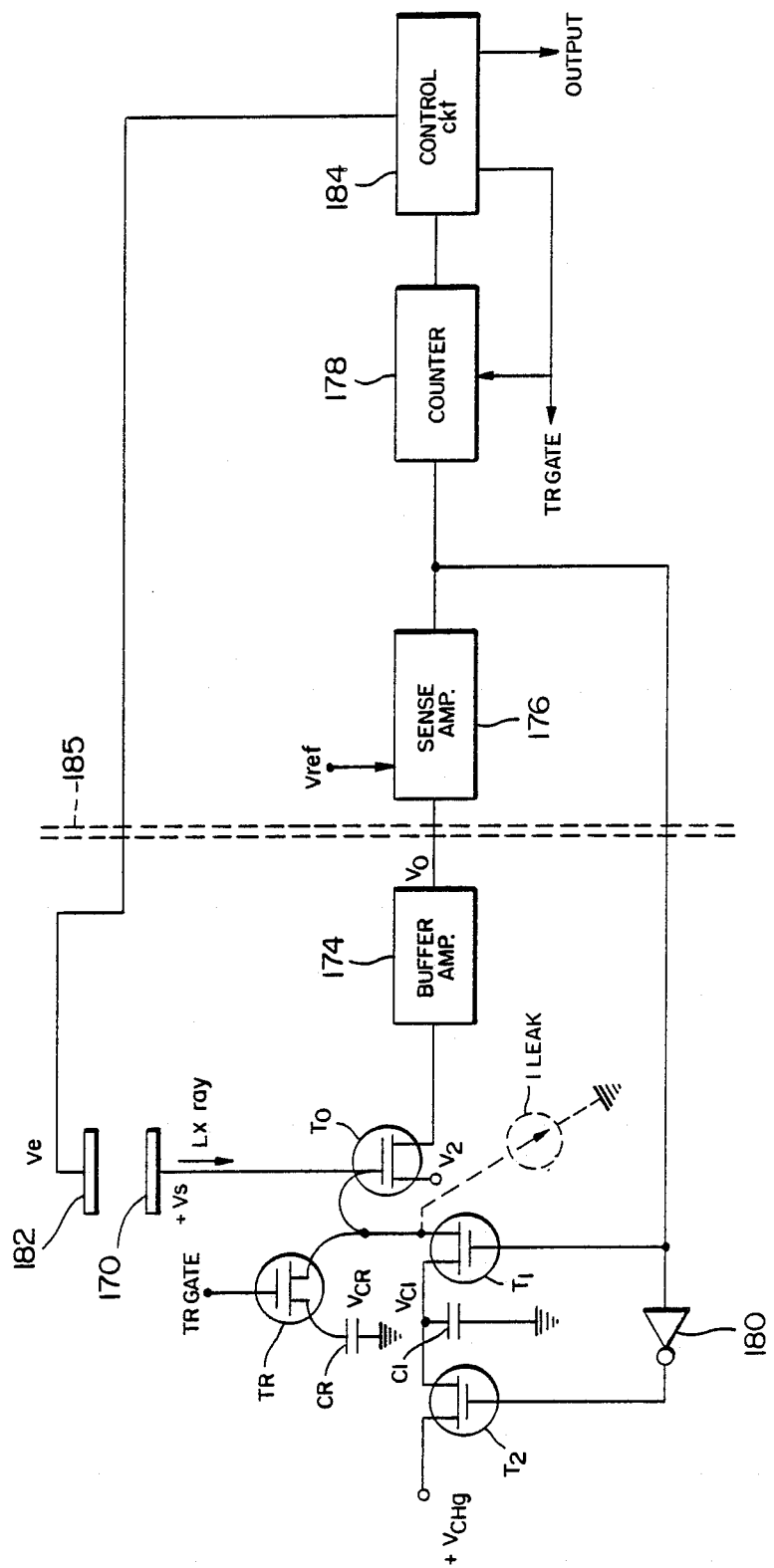
FIG. 16 illustrates a block diagram circuit that changes the rate at which the voltage changes on the collecting electrode dependent upon the radiation count.

FIG. 16 illustrates collecting electrode 170 and biasing electrode 182 as well as a rate change circuit that includes transistor $T_R$. Items to the left of the double dashed line 85 are considered part of the detection subassembly; items to the right are part of the detector control. The biasing voltage $V_e$ is applied to biasing electrode 162 providing an electric field that extends between collecting electrode 170 and biasing electrode 182. The bias voltage can be controllably set by a control circuit 184 coupled to the output of counter 178. As described earlier with respect to FIG. 12b, biasing voltage $V_e$ can be controllably set at a plurality of discrete levels dependent upon the count in counter 178. Particularly, the flyback circuits of FIGS. 13 and 14 could be used to apply this increased biasing voltage.

Another aspect illustrated in FIG. 16 is the circuit for changing the rate upon which the control gate of transistor $T_0$ changes. Transistor $T_r$ is controlled by rate change control signal TR gate from control circuit 184. When rate change control signal TR gate is high, capacitor $C_r$ is electrically coupled to the control gate of transistor $T_0$. Therefore, accumulated charge on collecting electrode 170 must charge or discharge capacitor $C_r$ and hence the rate at which signal $V_0$ changes is decreased because of the added capacitance.

The electronics has a maximum count rate set by its speed. If this maximum count rate becomes a limitation rather than the charge recombination rate discussed earlier, it is necessary to add the extra capacitance $C_r$ to reduce the sensitivity of the detection subassembly. When transistor $T_r$ is conductive, the amount of charge required to trigger sense amp 176 is increased. For a constant dose, if the counter is incremented by a number greater than 1 for each trigger pulse from sense amp 176, the calibration in the counter per collected charge stays constant but the period between counter updates is increased. Therefore, the speed of the electronics is no longer a limiting factor. In this sense, the control circuit 184 would monitor the dose rate and provide rate change control signal TR gate when the dose rate exceeds a predetermined level.

As stated earlier, the major difficulty with clearing or restoring voltage $V_s$ to the control gate of transistor $T_0$ via transistor $T_1$ is the current leakage ILEAK from the integrated circuit substrate to the drain of transistor $T_1$ and hence the collecting electrode. The rough estimate earlier presented indicates that this leakage may cause a pulse every eight seconds.

One method of compensating for ILEAK is simply to have the radiation detector not register any pulses unless the pulses are less than eight seconds apart. This operation is simply pulse stream manipulation. A second simple method is to have the radiation detector not register any dose when it is disabled or turned-off. The detector could be stored in a charging/disabling cradle during that time.

Figure 17:
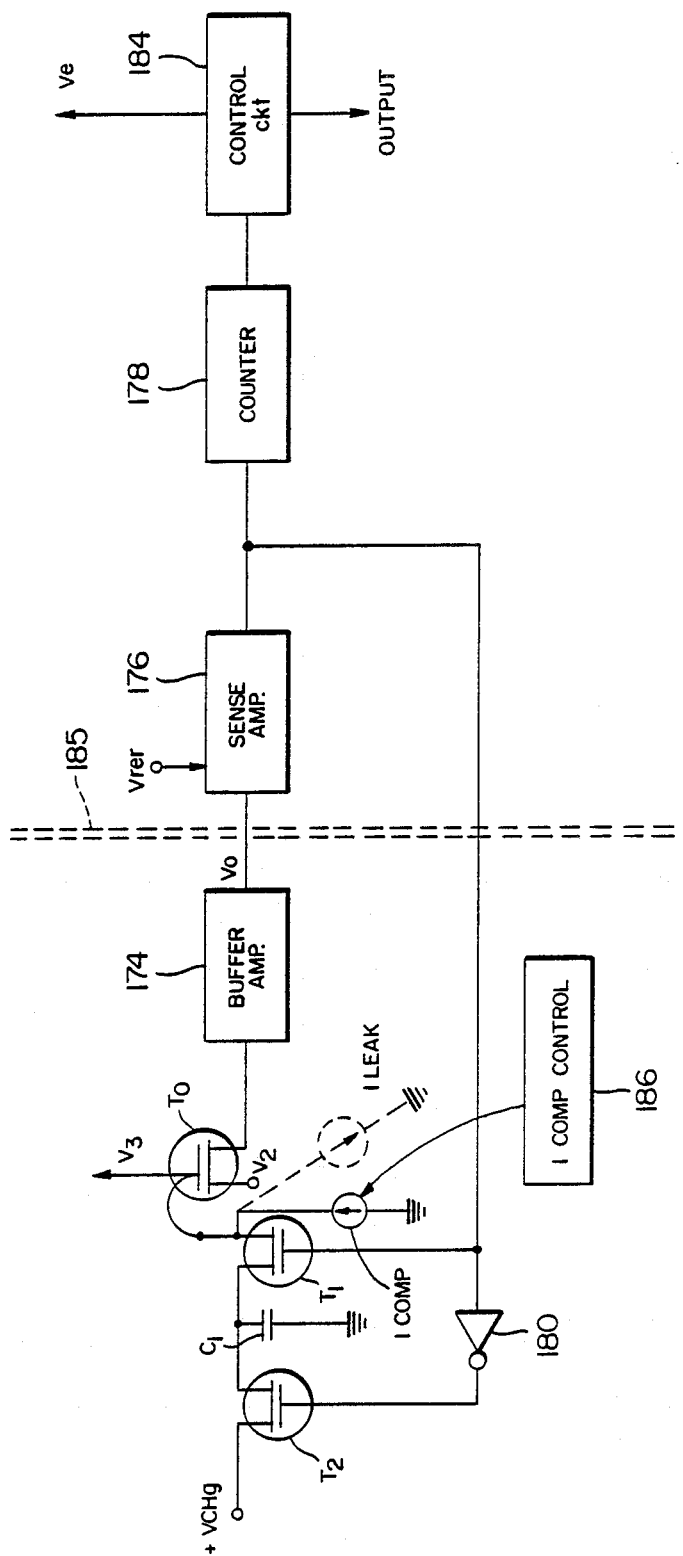
FIG. 17 illustrates a block diagram circuit for compensating current leakage between the drain of switching transistor $T_1$ and the IC substrate.

FIG. 17 illustrates a block diagram circuit for analog current subtraction used to compensate for the leakage current. Current generator ICOMP is controlled by ICOMP control 186. The ICOMP control would be sent during calibration of the detector. As is known by persons of ordinary skill in the art, if the voltages were reversed in FIG. 17, ILEAK would be a current source and ICOMP would be a current sink. In either situation, ICOMP is controllable by ICOMP control 186. The difficulty with this system is having ICOMP follow ILEAK as conditions vary.

Figure 18:
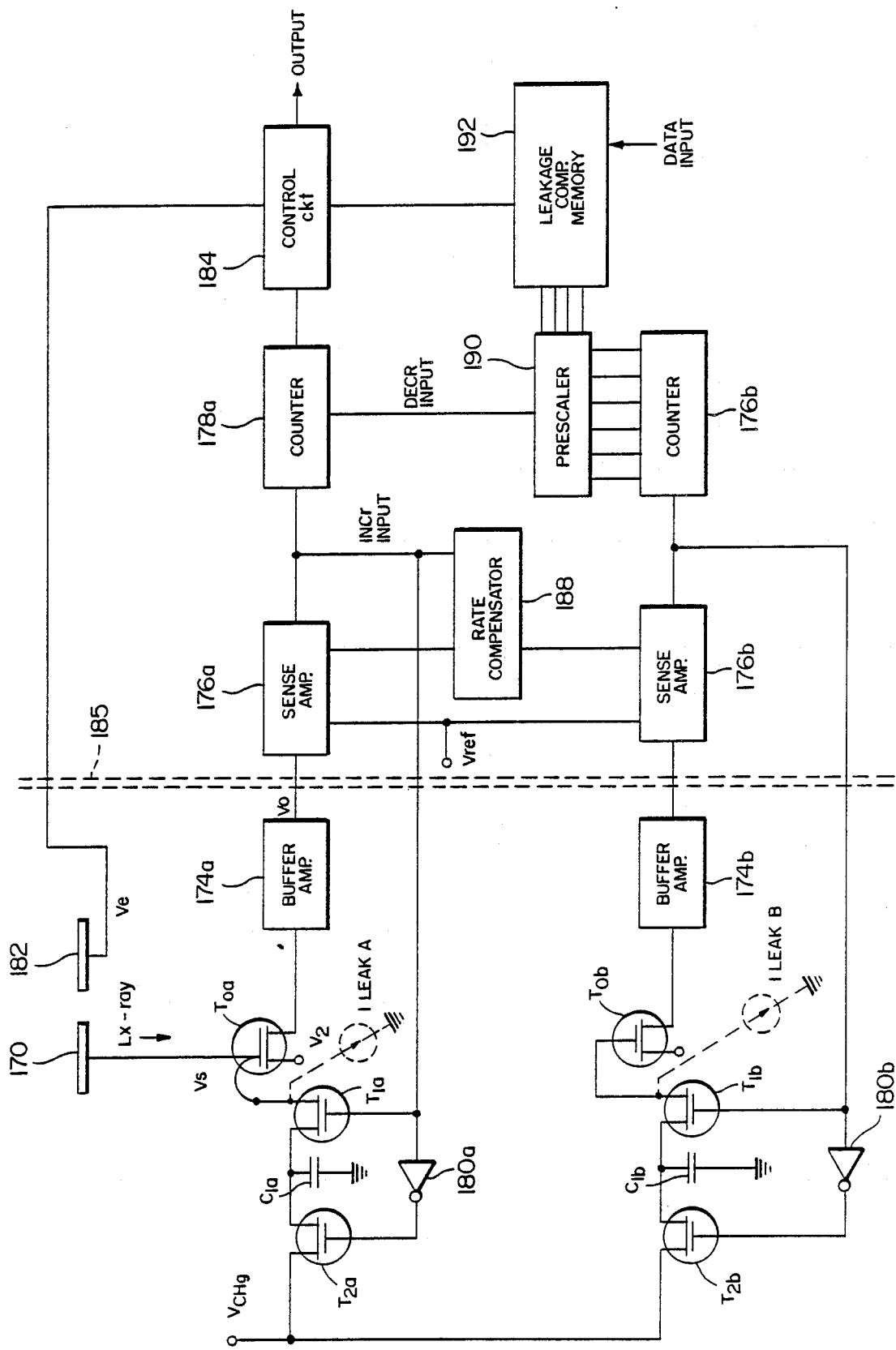
FIG. 18 illustrates further leakage compensation circuit.

FIG. 18 illustrates another alternative embodiment of a circuit to compensate for ILEAK. In that figure, the sensing circuit is indicated by character "a" such that transistor $T_0$ is now $T_{0a}$. $T_{0a}$ is coupled to buffer amplifier 174a, sense amp 176a and counter 178a. A duplicate circuit is illustrated with character "b." Therefore, the counterpart to transistor $T_{0a}$ is $T_{0b}$, buffer amp 174a is duplicated as amp 174b, etc. The primary distinction between the duplicate circuit and the sensing circuit is that the control gate for transistor $T_{0b}$ is not coupled to the collecting electrode in the duplicate circuit.

As long as $T_{1a}$ and $T_{1b}$ are equal in size and do not contain any gross defects, the leakages ILEAKA and ILEAKB should be almost identical. In other words, both leakage currents should track each other as conditions vary. Therefore, the true dose exposure can be determined by taking the difference between the number of pulses received by circuits a and b.

One compensation method utilizes a rate compensator 188. It senses when the pulse rate in sense amp 176a is less than the pulse rate in sense amp 176b and prevents an incrementing counter 178a. Thus, no dose is registered unless it is in excess of ILEAKB. A second method is better adapted to proportional but unequal ILEAKA and ILEAKB. A prescaler 190 decrements counter 178a when the count value from duplicative counter 178b equals the compensation count value in leakage compensation memory 192. The scaling circuit compensates for the measurement circuits not being identical. The leakage compensation memory is loaded during calibration and contains the proportionality constant related to the two circuits leakages.

Another method to reduce current leakage ILEAK is the well isolation inherent in CMOS process. By keeping the well of transistor $T_1$ equal to the voltage of the collecting electrode, significantly less leakage will occur.

FIG. 19 illustrates a further circuit, in block diagram form, for eliminating switching transistor $T_1$ and thus the source of leakage. The collecting electrode is only connected to the control gate of transistor $T_0$. The bias $V_{e(t)}$ drives a charge of one polarity to the collecting electrode 170. The single polarity charge accumulates ions at collecting electrode 170 until sense amplifier 176 triggers counter 178. Control circuit 184 changes the bias signal applied to bias electrode 182 thereby switching the electric field in the volume of gas to bring ions of the opposite polarity to collecting electrode 170. The oppositely charged ions cancel the previously accumulated charge on collecting electrode 170. In this situation, the minimum voltage $V_e(t)_{min}$ is less than $V_s$ which in turn is less than the maximum voltage $V_e(t)_{max}$. The reference voltage $V_{ref}(t)$ is varied such that the sense amp triggers the counter when signal $V_0$ exceeds a maximum threshold level in one instance and falls below a minimum threshold level in a second instance. Therefore, either the reference voltage must be switched within sense amp 176 or electrical circuitry be designed to determine when $V_0$ passes beyond a predetermined window.

Figure 20A:
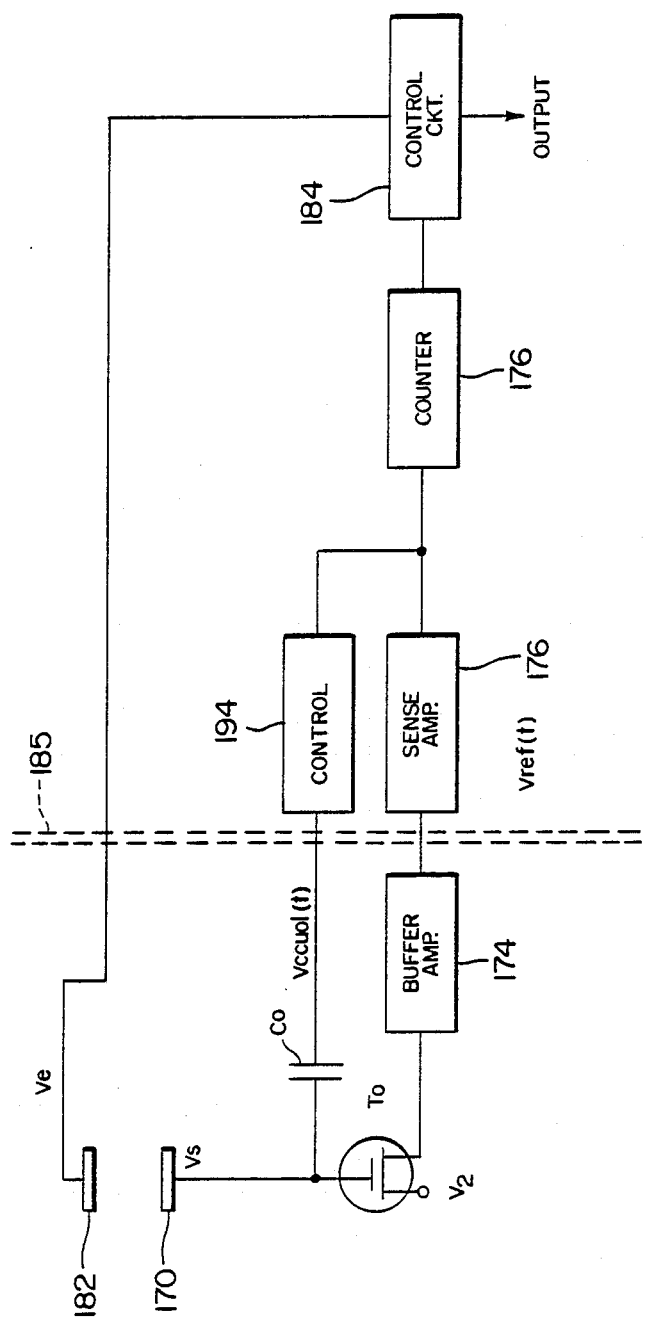
FIGS. 20A and 20B illustrate a block diagram circuit that changes the voltage level applied to the collecting electrode and the timing diagram therefor, respectively.
Figure 20B:
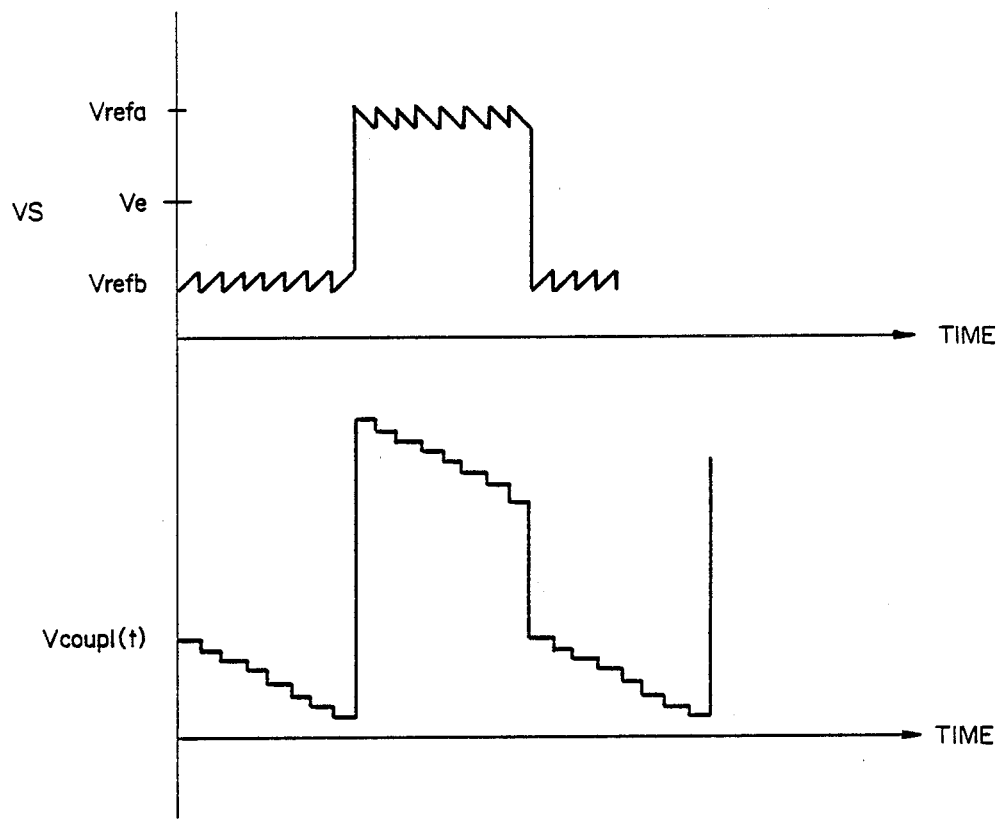

FIG. 20A illustrates a block diagram circuit which changes the voltage of collecting electrode 170 via a coupling capacitor $C_0$. In this embodiment, when sense amp 176 triggers counter 178 when $V_{coup1}(t)$ is at one level (see FIG. 20B), control circuit 194 switches coupling voltage $V_{coup1}(t)$ to a different predetermined level. Therefore, the voltage $V_s$ is biased to a high and then a low predetermined level based upon a level control signal applied to level control circuit 194. In this situation, the biasing voltage $V_e$ applied to biasing electrode 182 is at an intermediate level as compared to the maximum coupling voltage $V_{coup1}(t)_{max}$ and the minimum coupling voltage $V_{coup1}(t)_{min}$. Switching via the coupling capacitors is advantageous because all ion chambers can have the same counter electrode potential $(V_e)$ and the coupling capacitor is part of the integrated circuit.

There is an additional complication that the sense amp must now sense two voltages so some type of Schmitt trigger, window comparator or dual sense amplifiers must be utilized as sense amp 176. As described earlier with respect to the dual bias levels, the reference voltage $V_{ref}(t)$ varies between two threshold levels dependent upon the coupling voltage.

Figure 21:
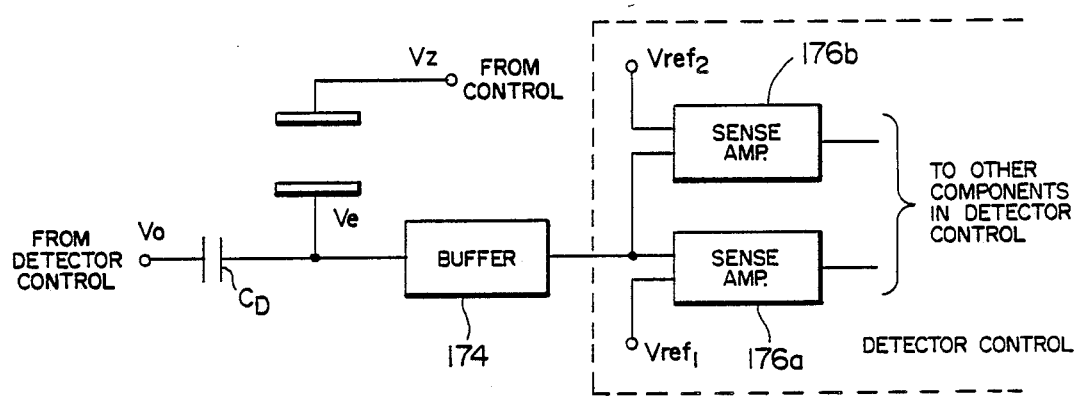
FIG. 21 illustrates a block diagram circuit that changes both voltage levels applied to the bias electrode and the collecting electrode.
Figure 22:
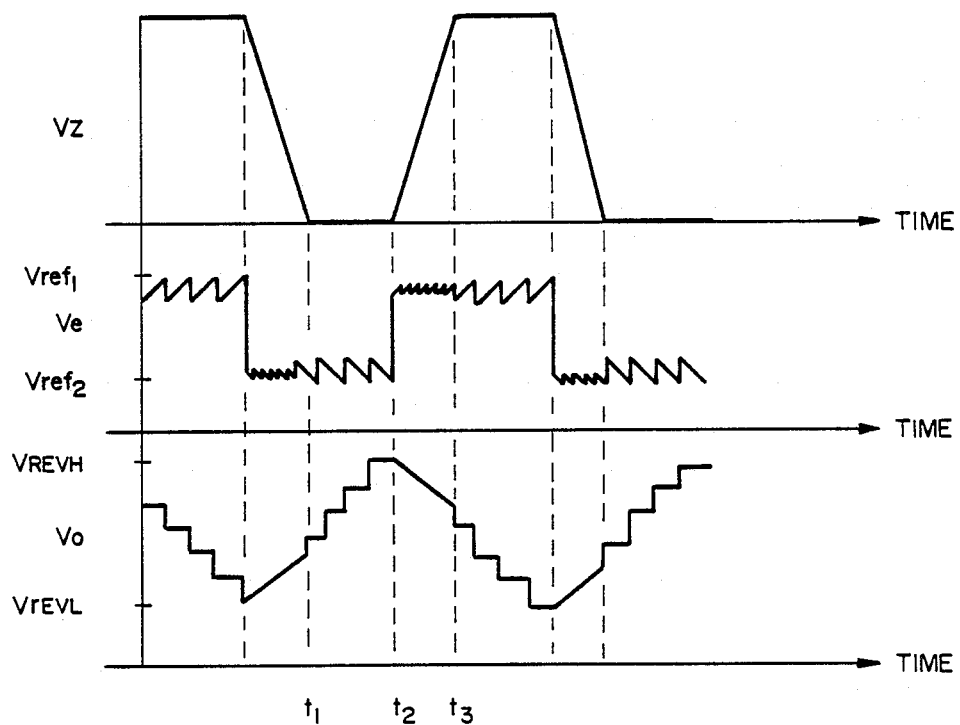
FIG. 22 shows a timing diagram for the circuit in FIG. 21.

FIG. 21 shows a block diagram of another circuit for clearing the accumulated charge on the collecting electrode. FIG. 22 shows the timing diagram for the operation of the circuit in FIG. 21. Generally, the polarity of the electric field is reversed periodically (see $V_z$ in FIG. 22) similar to the operation described in FIG. 19, i.e., when $V_D$ reaches $V_{revL}$ or $V_{revH}$ or effectively after a certain number of counts. Sense amplifiers 176a and 176b trigger a counter or other detector control component when the signal exceeds or falls below one of two reference voltages $V_{ref1}$ or $V_{ref2}$. However, with the addition of capacitor $C_D$, the frequency at which field reversal is required is greatly reduced, if each time the threshold is exceeded, the voltage $V_D$ is changed in a stepwise manner. The relatively small voltage step restores the voltage of the amplifier input to its original value (see $V_c$ between times $t_1$ and $t_2$) and prepares the amplifier to sense another pulse. This circuit substantially eliminates any inaccuracy which arises when the field polarity is changed after each pulse. Also, it confers some noise resistance similar to that given by constant charge removal versus constant voltage reset.

A change in $V_D$ indicates one pulse sensed by one of the sense amps. From times $t_1$ to $t_2$, these pulses represent charge sensed and thus dose received. From times $t_2$ to $t_3$, the pulses are simply a result of the changing $V_z$ being capacitively coupled to $V_c$.

Even without the conducting path through switching transistor $T_1$, leakage can still occur through other paths. It may be necessary to include a guard ring as one of the electrodes (for example, $E_3$) around the sensing pad (for example, $E_1$ or $E_2$) to minimize leakage over the silicon dioxide layer in the integrated circuit and the passivation materials on that integrated circuit. One method of compensating for stray capacitance and stray electric fields developed by components internal of the integrated circuit is to have the guard electrode at the same potential as the sensing electrode. The geometry of the guard and the sensing electrode would be chosen such that the guard receives few of the flux lines of the electric field but surrounds the sensing electrode, thereby interrupting any surface leakage from the internal components.

Any of these methods of leakage compensation can be combined with any ion chamber described above. In a currently preferred embodiment, a large ion chamber would utilize integrated circuit control without switching transistor $T_1$ and utilize electric field reversal. Then, the same or a different integrated circuit senses the accumulated charge from a second smaller ion chamber utilizing the simplest sensing circuit illustrated in FIG. 15. No leakage compensation is necessary in this simple circuit because the count from the small ion chamber is recognized only if the dose rate is high. Also, in the contamination monitor discussed previously, this ion chamber configuration would be repeated for each of the three tissue depths at which a measurement is to be made.

Figure 23:
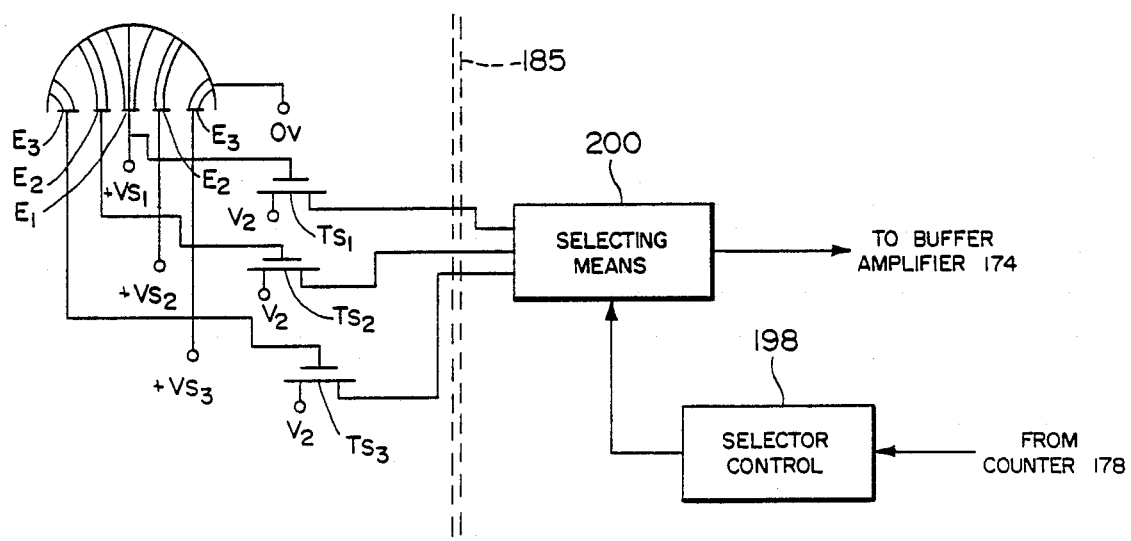
FIG. 23 illustrates multiple electrodes coupled to a selecting means in block diagram form.

FIG. 23 is a further development from FIG. 10. In this situation, selector control 196 actuates selecting means 200 which selects one of the electrodes $E_1$, $E_2$ or $E_3$ as the collecting electrode. The accumulated charge from the selected collecting electrode would be applied via $T_{s1}$, $T_{s2}$ or $T_{s3}$ to buffer amplifier 174. In a similar manner, biasing electrodes could be selected to apply different levels of biasing voltage for the electric field at different times. Because different volumes of the gas are swept by the electric field of the different electrodes, changing the biases and the collecting electrode changes the sensitivity and dose rate limits of the radiation detector.

Figure 24A:
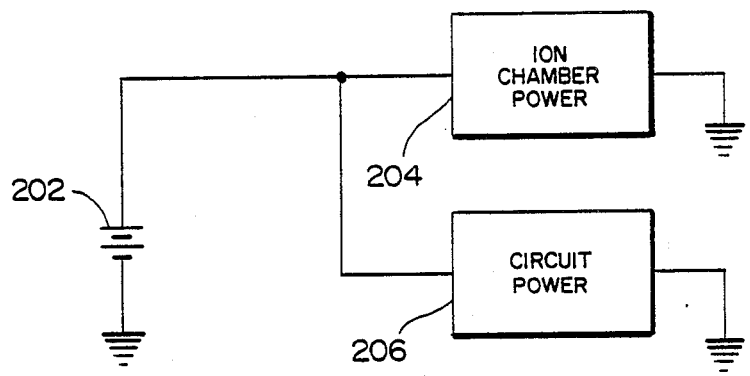
FIGS. 24a, 24b and 24c schematically illustrate a power circuit, a flyback circuit and a capacitive voltage multiplier for the present invention.
Figure 24B:
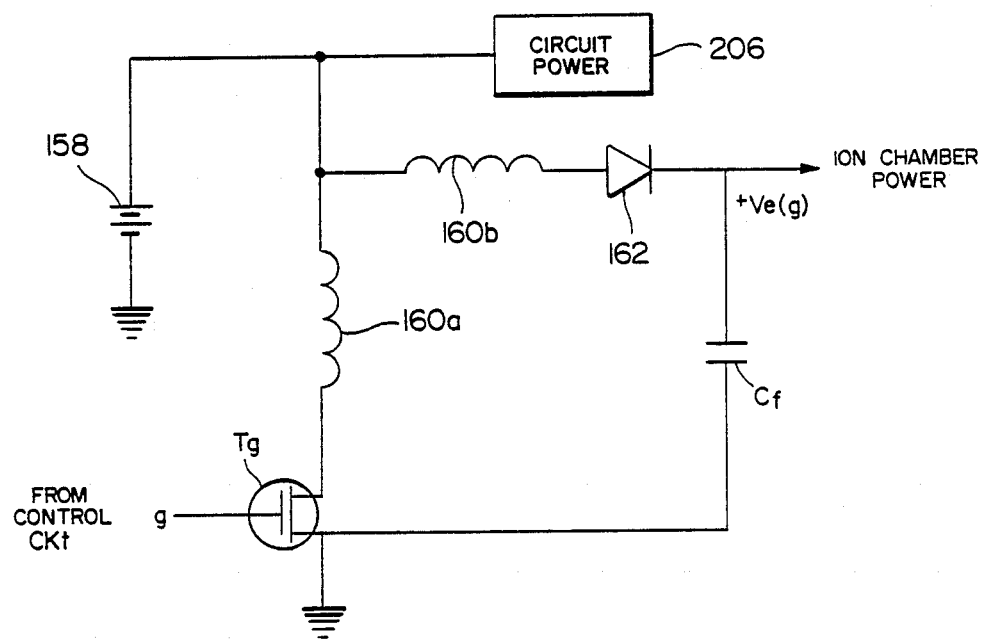
Figure 24C:
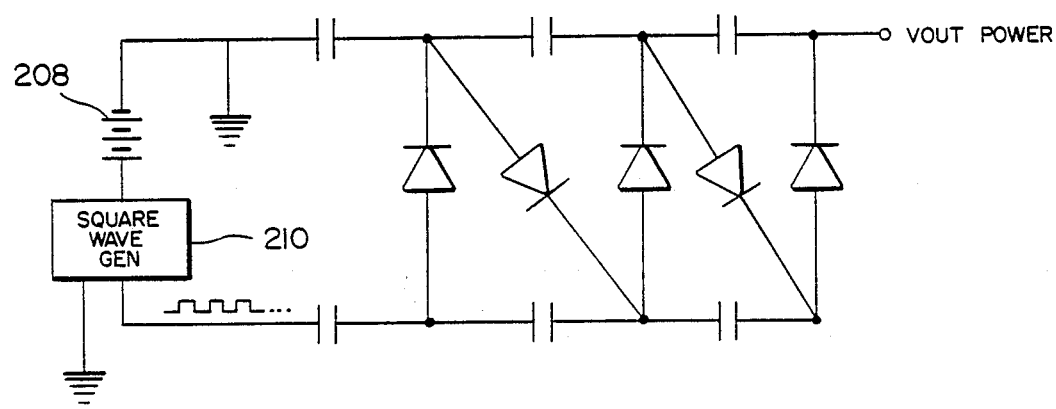

FIGS. 24a, 24b and 24c illustrate power circuits for the detector. In FIG. 24a, the power from battery 202 is applied directly to ion chamber power 204 as well as to circuit power 206.

In FIG. 24b, the flyback circuit, earlier illustrated in FIG. 14, is combined with circuit power 206 and both are coupled to one side of battery 158.

FIG. 24c illustrates a capacitive voltage multiplier which increases battery voltage without the need for an inductor. Square wave generator 210 activates the set of capacitors to achieve this multiplication of voltage.

In all the power supply types mentioned above, if the concept of alternating bias voltage polarity is used, then significant power may be lost each time the voltage is switched, unless an inductor or some other means is used to store the energy and reverse the voltage of the ion chamber. However, this may not be a serious problem because this circuit is used primarily in low dose applications.

Figure 25:
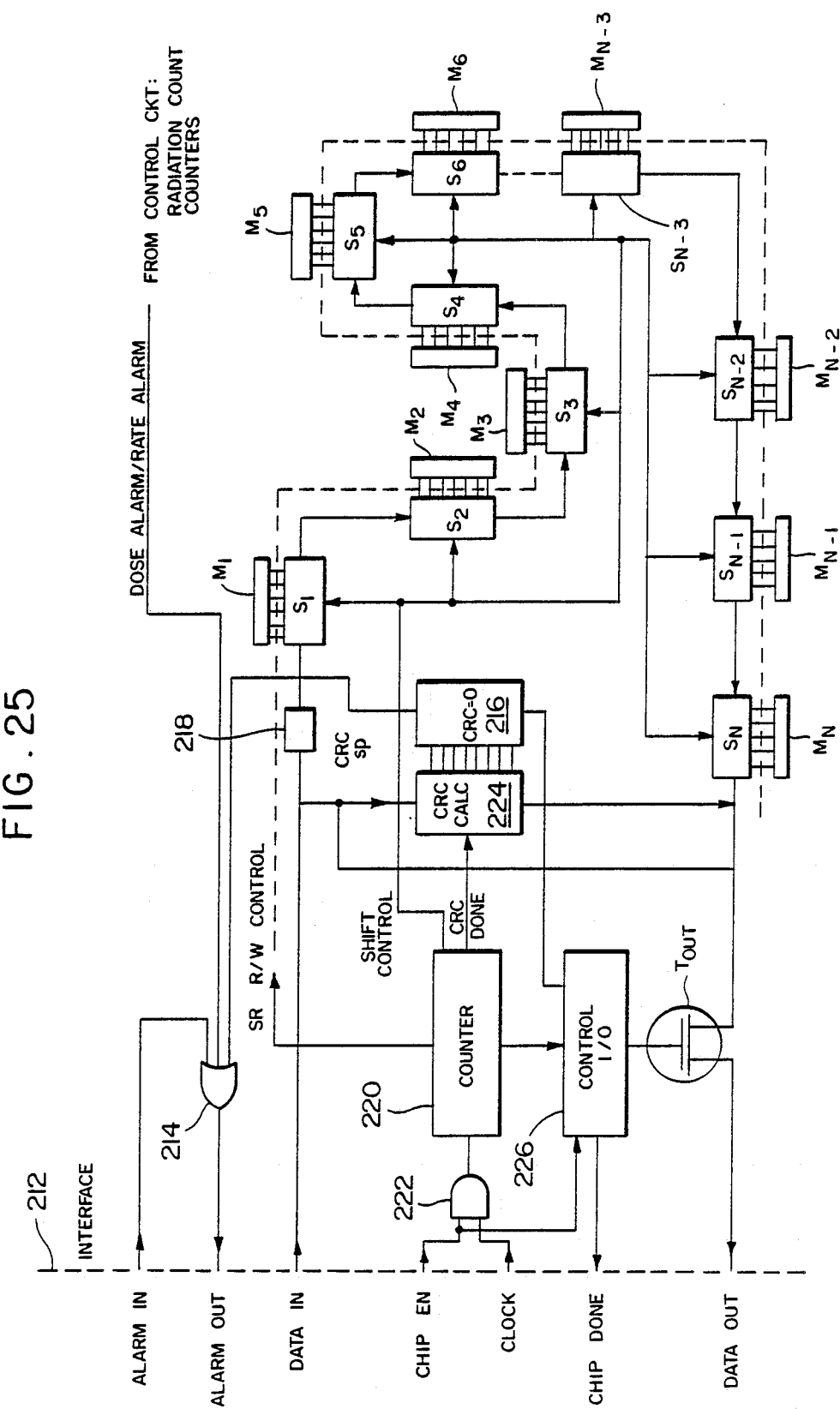
FIG. 25 illustrates a memory and communications section for the radiation detector.
Figure 26:
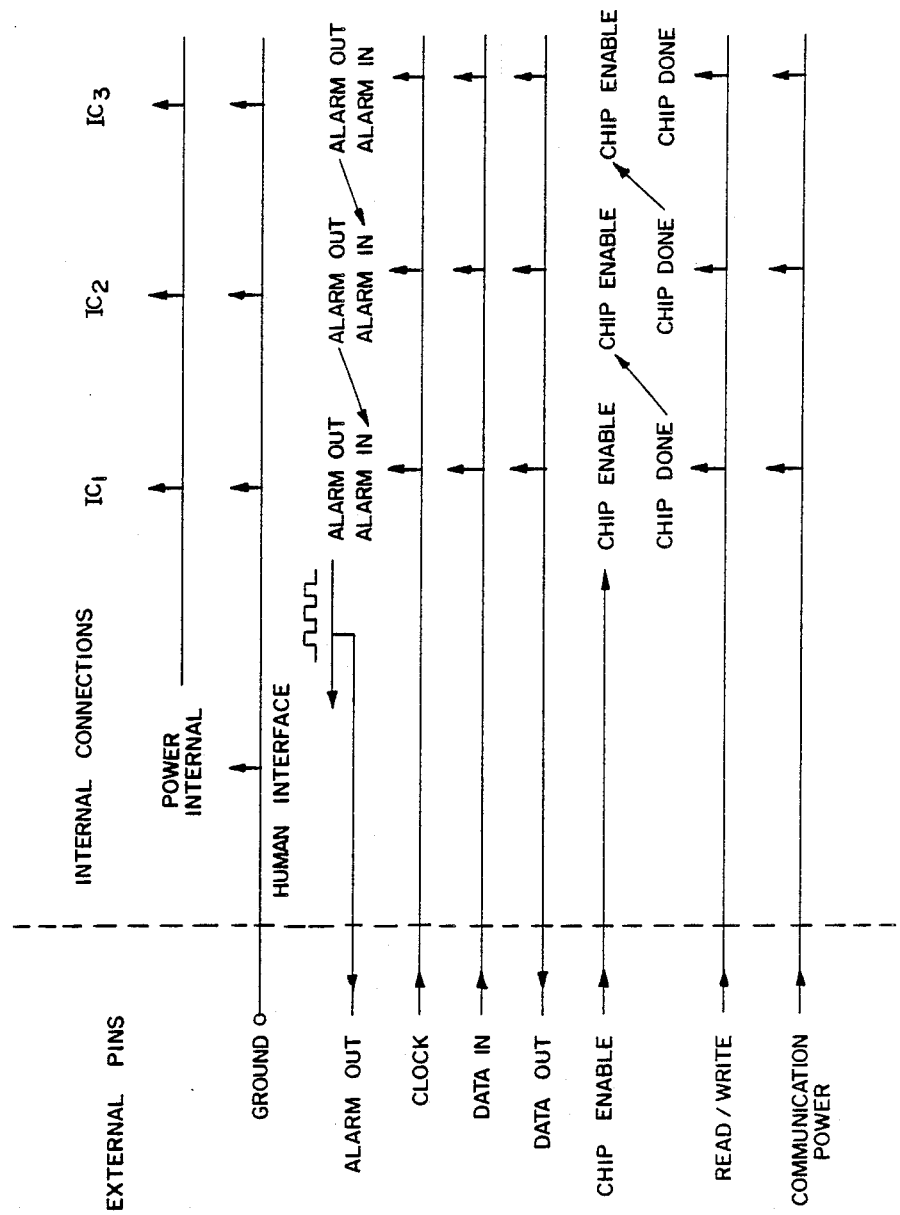
FIG. 26 illustrates the power an-d communications paths for multiple integrated circuit elements in the detector.

FIG. 25 illustrates, in block diagram form, the memory and communications section in the detector control. In one embodiment, this section is associated with one IC. This communications section is a means for recovering the radiation count from the counters. The dashed line 212 indicates an interface with a bus structure for transferring data and command or control signals between the memory and communications sections for other ICs. In one embodiment, all the integrated circuits are connected as is best illustrated in FIG. 26, the power and communication path diagram. For example, the alarm out line is activated if any one of the ICs, $IC_1$, $IC_2$ or $IC_3$, generates an alarm. The alarm is passed from IC to IC by the alarm-in/alarm-out interconnection between the three integrated circuits. The alarm is passed to the human interface 34 in FIG. 1 when the radiation detector is, for example, configured as an area alarm monitor or as a contamination monitor. The data out line is coupled to the electronic interface 36 when the radiation detector is configured as a survey meter or an exposure rate meter. In the latter configurations, the chip enable command would be periodically actuated to provide a seemingly continuous radiation readout.

In FIG. 25, the alarm-out line is raised when any line coupled to OR gate 214 is raised: the alarm-in line, the dose alarm/rate alarm line from the control circuit/radiation count counters or the cyclic redundant character (CRC) control check circuit 216.

Memories $M_1$, $M_2$, $M_3$, $M_4$, $M_5$, $M_6$, $M_{n-3}$, $M_{n-2}$, $M_{n-1}$ and $M_n$ are coupled to various counters and other devices in the integrated circuit. For example, counter 178 (FIG. 15 and others) may be directly coupled to one of these memory units or may be the memory unit $M_n$. Counter 178 and control circuit 184 must include some type of memory to trigger the control signal g (see FIG. 14), the change rate signal TR gate (see FIG. 16), the ICOMP control (see FIG. 17) and the level and pulse duration of $V_{e(t)}$ (see FIG. 19) and the coupling voltage (see FIG. 20). Also, the leakage compensation memory is a memory unit.

Shift registers $S_1$, $S_2$, $S_3$, $S_4$, $S_5$, $S_6$, $S_{n-3}$, $S_{n-2}$, $S_{n-1}$ and $S_n$ are connected to corresponding memory units. These serially connected shift registers are supplied with data on the data in line. The CRC space control device 218 is needed to hold the 16 CRC characters used to confirm accurate data reception without displacing any data from its proper locations. All of the serially connected registers are loaded during a data write routine and a shift register write (SRW) control signal from counter 220 loads the shift register data into the appropriate memory. Shift control to each shift register is also accomplished by a control line from counter 220.

Counter 220 is activated by a chip enable signal and a clock signal which is fed to AND gate 222. The output of the counter is also fed to CRC calculator 224 to indicate when to calculate and output, or check, the CRC. The control input/output circuit 226 is coupled to the chip enable line and to the output of the CRC checker circuit 216. I/0 control 226 activates transistor $T_{out}$ and allows the data to be reflected on the data-out line. Also, when the counter 220 determines that the last 16-bit word is appropriately checked, it places a value of the CRC calculator 224 on the data-out line. The last 16 bits represent the CRC code which is used by the receiving device to determine if the transmission was accurately received.

Data can be shifted into memory with a shift register read/write control line. When the read or write operation is completed for the present chip, the next chip is enabled. To write data from outside, data is shifted from $M_x$ to $S_x$ by the shift register read/write control line. Then the shift registers are shifted once on each clock cycle with one bit coming out and also going to the CRC calculator 224. When all the data is out, the 16-bit CRC is shifted out.

FIG. 26 illustrates the power and communication path for the detector with integrated circuits $IC_1$, $IC_2$ and $IC_3$. Power and ground are applied from an internal battery in the detector control unit. The alarm is a daisy chained signal. If the alarm is active, it gets passed along. The active alarm signal out of the last chip turns the piezoelectric buzzer on if the detector is configured with an active human interface. In another embodiment, the alarm could trigger a communications transmit command through the electronics interface. Upon receipt of this transmit command, the detector would transmit radiation data, e.g., dose or dose rate, to an external device. Data read and write is synchronized by the clock. The clock and all power for the external communication drivers and internal shift register is provided by communications power which is in turn supplied by a calibration and display unit.

To read, the chip enable and read line are held low. The read/write is brought high for X clock cycles and then low. After Y cycles, the chip enable is brought high. Z cycles later, all data in the $IC_1$ is shifted serially out the data-out line. When $IC_1$ is done, it enables $IC_2$. Z cycles later, the data from $IC_2$ comes out on the data-out line. When writing, the dosimeter counters are disabled. To write data, the read/write control line is held high and kept high. After A cycles, the chip enable is brought high. After B cycles, the data is serially read in on the data-in line until all shift registers are full. When $IC_1$ is loaded, it raises the chip enable of $IC_2$. When all the data is loaded, bringing the write line low before lowering the chip enable line causes data to be stored into the integrated circuit chip memories.

Figure 27:
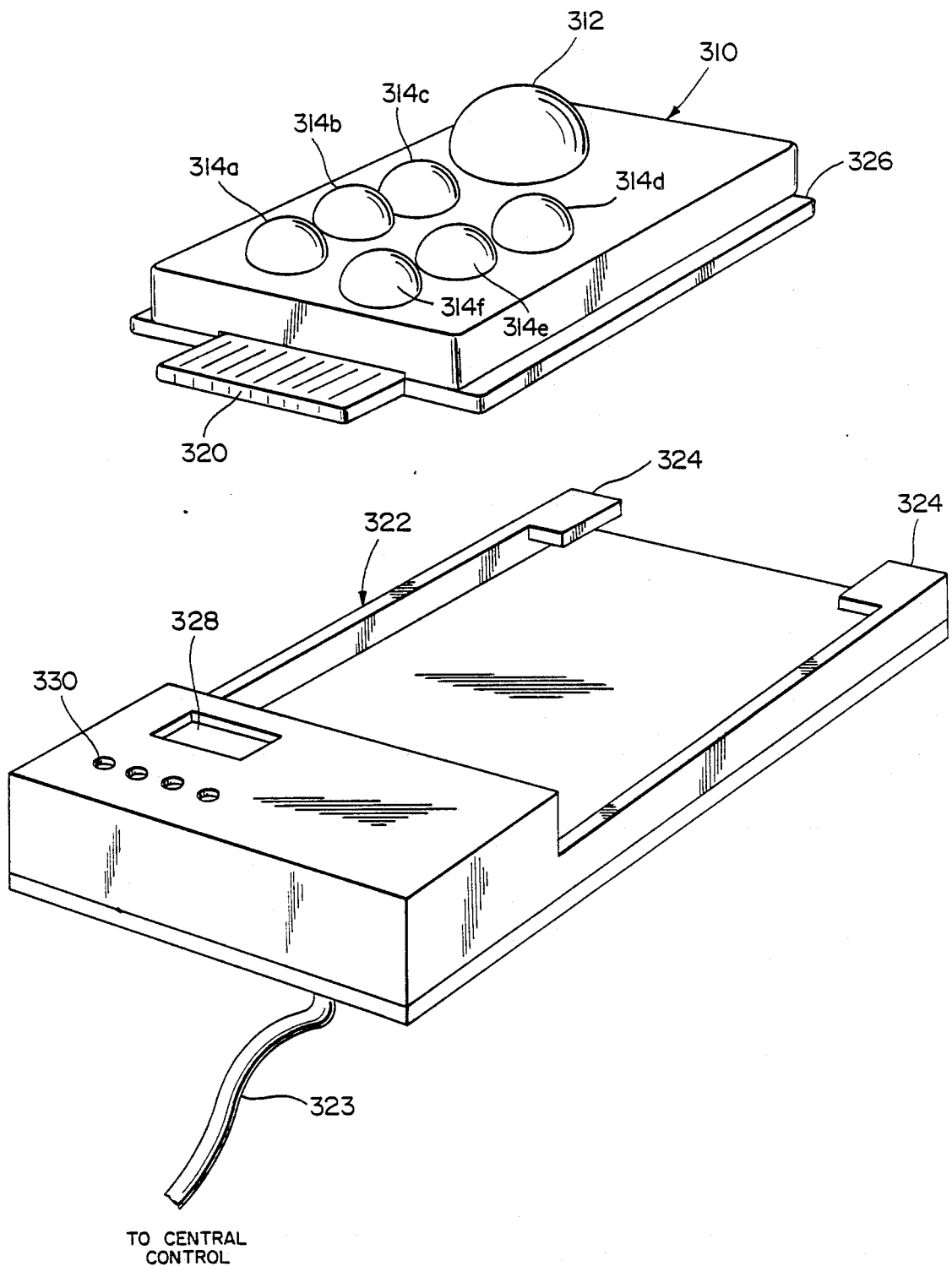
FIG. 27 illustrates an exploded view of the radiation detector and a cradle display unit which mates with the detector.

FIG. 27 illustrates detector unit 310 having ion chambers 312, 314a, 314b, 314c, 314d, 314e and 314f. The large ion chamber 312 is most sensitive to radiation. The smaller chambers 314a through f are less sensitive but are capable of accurately detecting higher doses and dose rates as compared with the larger chamber. Or the ion chambers inside domes 312, 314 and 317 may all be identical and so have identical dose rate responses, but have different wall thicknesses and, thus, be measuring dose at different depths into the body. Electrical contacts 320 extend from one end of unit 310.

External connections 320 on detector unit 310 are provided to facilitate the transfer of information, i.e., radiation data, control commands, ground and power signals as necessary. The use of output drivers in the detector unit that obtain power from an external battery in a cradle display unit 322 prevents the possibility that one or more contacts 320 would short together and result in a spark or drain of the internal battery in the detector unit. The only common connection between the internal circuitry in the detector unit and the external unit such as display unit 322 is ground. Alternatively, data communications can use an optical link, encoded sound, near or far field electromagnetic waves, rather than electrical contacts.

A cradle, interface and display unit 322 is separably mated with detector unit 310. As illustrated, display unit 322 includes lip portions 324 which mate with ledge or flange 326 on detector unit 310. Display unit 322 includes LCD display 328 and recessed control buttons 330. Electrical contacts 320 on detector unit 310 mate with complementary electrical contacts not shown in display unit 322. The illustrated connection 323 to central control is optional since the mated detector and display units can operate as a stand alone apparatus or can operate in conjunction with multiple mated units.

The radiation detector unit is separably mated to display unit 322 in order to allow the detector unit to be regularly tested and appropriately calibrated. The display unit and detector unit can be permanently mated in order to provide a survey meter, a contamination monitor or other types of radiation monitors requiring substantially continuous or controllably displayble radiation data displays. Further, the geometric configuration of ion chambers 312 and 314a–f is only exemplary. The ion chambers can be geometrically configured in as many shapes as are permitted by manufacturing constraints. A grid, barrel or hemispheric geometric configuration may be appropriate, respectively, for a contamination monitor, directional survey meter and a wide area survey meter.

Display 328 is a means for recovering the radiation count from the counters. Display unit 322 can also be configured as a programming device to set threshold limits, e.g., dose and dose rate thresholds, in the detector unit. Control buttons 330 can be utilized to confirm the thresholds input via the buttons and then confirm a successful programming of the detector unit. Since unit 322 can be viewed as a programming device, that unit is referred to herein as a programming and display unit.

Figure 28:
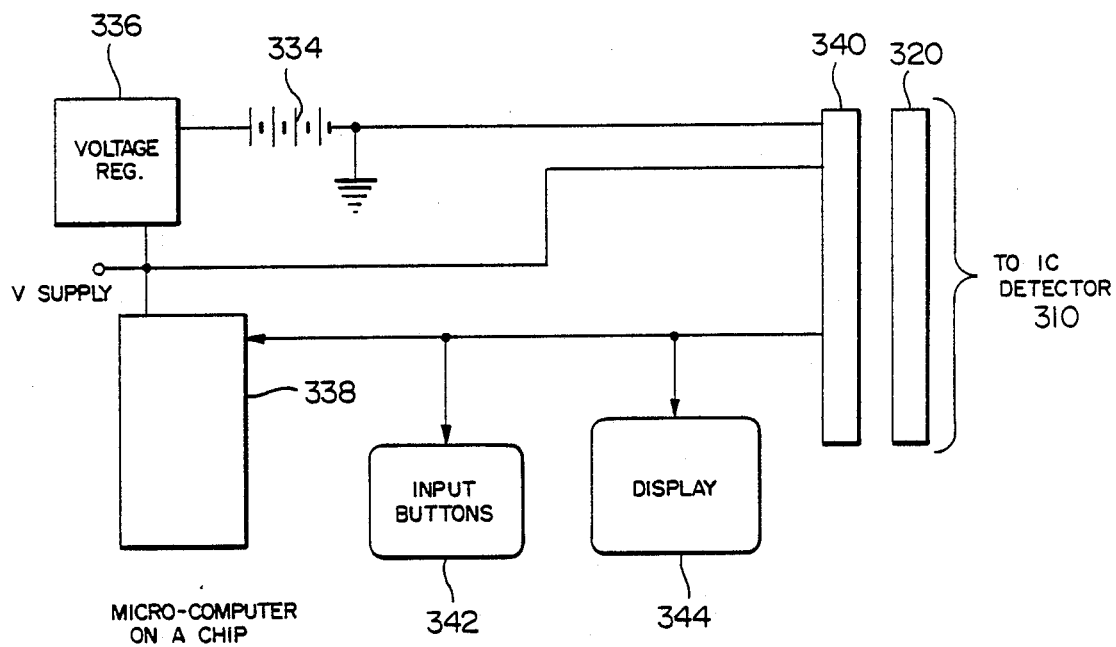
FIG. 28 illustrates a block diagram circuit for the display unit.

FIG. 28 illustrates, in block diagram form, the electrical components of programming and display unit 322. Battery 334 is coupled to an optional voltage regulator 336 which supplies voltage $V_{supply}$ to microcomputer on a chip 338 (herein microcomputer chip 338) and to connector pin unit 340. Connector pin unit 340 matingly couples with pin unit 320 of the detector unit 310.

Microcomputer chip 338 is coupled to input buttons 342 and display unit 344. Microcomputer chip 338, when activated by input buttons 342, generates a data transfer command to detector unit 310. This transfer command is the read command discussed above with respect to FIGS. 25 and 26. The output from the detector unit is placed in a memory which is part of microcomputer chip 338. Also, the radiation data from the detector control interface, e.g., the counters, is displayed on display 344. Microcomputer chip 338 also programs threshold values into detector unit 310. For example, microcomputer chip 338 programmably sets the total dose alarm threshold, the dose rate threshold and the trigger threshold for the counter. The total dose alarm threshold is that radiation count value which, when exceeded, triggers the audible and electrical alarm in the radiation detector.

Figure 29:
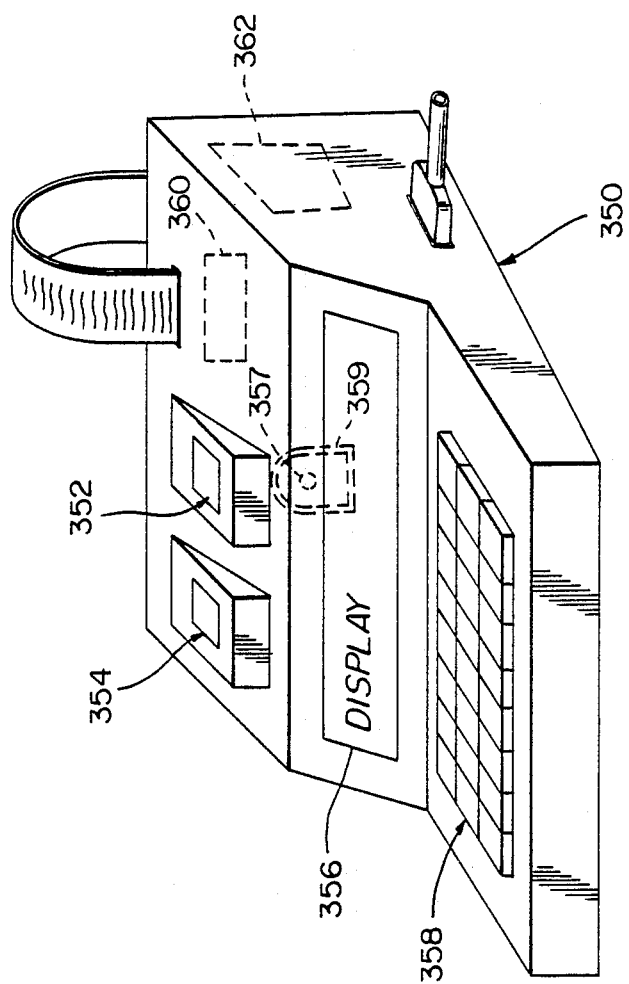
FIG. 29 illustrates a detector calibration and display device.

FIG. 29 illustrates a calibration and display device 350. The radiation detector is placed in either of two mounting positions, the calibration position 352 or the readout position 354. Calibration unit 350 includes display device 356 and keyboard 358. Printer 360 provides a printed copy of the information obtained from the IC dosimeter. Particularly, during calibration, a predetermined amount of radiation, from radiation source 357 (shielded by shield 359), is directed toward the detector unit. Calibration unit 350 monitors the resulting radiation data (both total dose and dose rate as necessary) and then compares that radiation data against accurately predetermined radiation data. This computation is carried out in microcomputer 362. The detector would then be programmed such that the threshold level of the sensing amplifier (a threshold determining means) would be set and further the alarm threshold levels for the alarm circuitry would be set by calibration unit 350.

When the radiation detector unit is in readout position 354, calibration unit 350 would generate a transfer data command to the detector and read out all data including the current radiation data from the memory units. Appropriate information is displayed on display 356 and printed out by printer 360. Additionally, calibration unit 350 could program a date of calibration into the radiation detector unit as a historical indicator in the detector's memory. The calibration unit also resets or clears selected counters, if necessary, in the detector. Additionally, the calibrator includes a memory, clock, analog and digital interface circuits, and an I/0 computer communications port to transfer data information to other computer devices.

Figure 30:
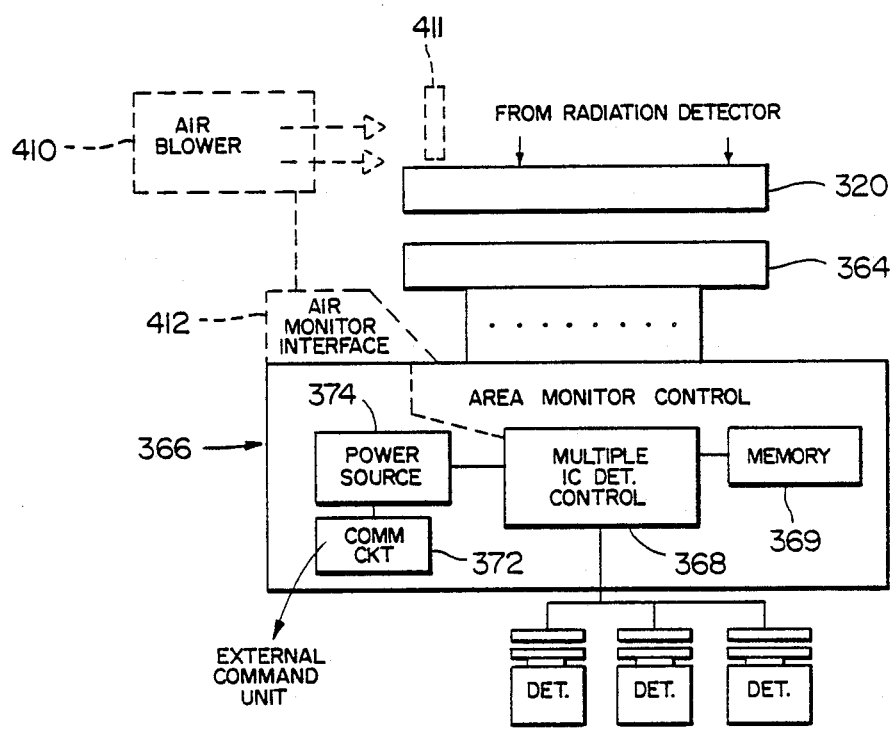
FIG. 30 illustrates an area monitor utilizing four detectors.

FIG. 30 illustrates an area monitor which utilizes a plurality of radiation detectors $DET_1$, $DET_2$, $DET_3$ and $DET_4$ mounted on a support wherein $DET_1$ is illustrated as directionally oriented or facing one region and the others are facing the opposite region. The radiation detectors are plugged into complementary electrical connectors 364 of area monitor 366. In another embodiment, area monitor 366 utilizes at least four radiation detectors disposed 360° around an area monitor. A multiple IC detector control 368 periodically obtains the radiation count values from IC detectors $DET_1$, $DET_2$, $DET_3$ and $DET_4$ by issuing appropriate transfer commands; accumulates the data and relates the data to the particular detector actuated thereby indicating direction, and relates the data to date and time information; and during other occasions periodically communicates via communications circuit 372 to an external command unit. Area monitor 366 would include its own power source 374 to enable the area monitor to be self-sufficient and to power the detectors.

Area monitor 366 is generally an environmental monitor which provides information regarding the direction as well as the amount of the radiation. A further embodiment of the area monitor is the addition of air blower or air pump 410 coupled to air monitor interface 412. By forcing air over radiation detector $DET_1$ 320, the monitor measures the amount of radiation in the air. Further, an activated absorbing substance 411 can be interposed in the path of the forced air to trap particles or gases therein. Radiation detector 1 is mounted proximate absorbant 411 to measure the radiation output therefrom.

The radiation detector may include some components to eliminate the possibility of data loss. An EEPROM on the integrated circuit could be utilized such that battery failure does not result in a loss of data. Further, the radiation detector could chirp a "low battery" signal when the internal battery reached a predetermined low value. A person of ordinary skill in the art recognizes that the human interface alarm, sounded by the detector, could include a visual alarm as well as an audible alarm. Further, the alarm signifying an overexposure of radiation (total dose) could be different than the alarm signifying an unacceptably high dose rate, i.e., different intensity, frequency and/or duty cycle.

While only certain preferred features of the invention have been shown by way of illustration, many modifications and changes can be made. It is to be understood that the appended claims are intended to cover all such modifications and changes as fall within the true spirit and scope of the invention. For example, transistor $T_0$ may be part of a differential amplifier or the collecting electrode may be a voltage follower input. Transistors $T_1$ and $T_2$ may be two of many additional transistors. Also, the audible alarm could require a square wave generator as illustrated in FIG. 24.

This concept can be applied to radiation detectors which presently use Geiger-Mueller tubes, scintillators and photomultipliers, or solid state detectors where the decreased absorption of a gas filled ion chamber, when compared to a solid material, is not important. Also, due to their low input capacitance and resulting high sensitivity, the radiation detectors can replace proportional counters which use multiplication within the gas.

This concept can also replace passive detectors, such as film or thermoluminescent detector material, in applications or apparatus where immediate readout would be advantageous. This includes but is not limited to radon monitoring and occupational monitoring.

What is claimed is:

1. A radiation detection system for measuring radiation, the system comprising:
   a radiation detector having at least one radiation detection subassembly including:
   means for defining a volume of gas, said gas being a detection medium adapted to be ionized by said radiation;
   a surface element positioned in direct contact with said gas and being part of said means for defining a volume of gas;
   means for generating an electric field within said volume of gas and for collecting ions present therein including at least one collecting electrode positioned on said surface element for collecting ions created in said ionizable gas;
   amplifying means electrically connected to said collecting electrode for generating a signal representative of the collected ions;
   controlled discharge means for removing charge from said collecting electrode; and
   means for minimizing inaccuracies in said system due to leakage currents to said collecting electrode from said discharge means or said amplifying means;
   interface means for buffering said signal generated by said amplifying means;
   detector control means for controlling said controlled discharge means; and
   means for supplying power to said at least one radiation detection subassembly and said detector control means.

2. The system of claim 1, wherein an input to said amplifying means at said collecting electrode is sealed within the volume of gas and isolated from moisture, and wherein said collecting electrode is electrically isolated from elements outside of said volume of gas.

3. The system of claim 1, wherein said controlled discharge means comprises a transistor that unintentionally introduces a leakage current into the collecting electrode, said leakage current being controlled by said means for minimizing inaccuracies.

4. The system of claim 3, wherein said means for minimizing inaccuracies comprises a current source for inducing current of a polarity opposite to that of the leakage current flowing to the collecting electrode, said current source being controlled by said detector control means.

5. The system of claim 4, and further comprising a duplicate controlled discharge means and a duplicate amplifying means, said duplicate amplifying means and said duplicate controlled discharge means being not connected to said collecting electrode, and supplying electrical signal information to said detector control means for controlling said current source.

6. The system of claim 1, and further comprising a duplicate controlled discharge means and a duplicate amplifying means, said duplicate amplifying means and said duplicate controlled discharge means being not connected to said collecting electrode, and producing an output signal fed to said detector control means for minimizing inaccuracies due to leakage current.

7. The system of claim 1, wherein said controlled discharge means removes charge from said collecting electrode in predetermined size packets of charge, said controlled discharge mans producing as output a pulse for each packet of charge removed from said collecting electrode so that the number of pulses produced as output by said controlled discharge means is a measure of the charge collected on said collecting electrode, and the rate of said pulses is related to the current to the collecting electrode.

8. The system of claim 7, and further comprising a voltage source, and wherein said controlled discharge means comprises two transistors connected in series between said collecting electrode and said voltage source, said transistors being controlled and switched sequentially so that only one transistor conducts at any one instant in time for removing predetermined size packets of charge from the collecting electrode and delivering said charge to said voltage source.

9. The system of claim 7, and further comprising counting means forming a part of said detector control means for counting events corresponding to the removal of charge by said controlled discharge means, and wherein said means for minimizing inaccuracies comprises means for controlling said counting means to ignore charge removal events if said charge removal events do not occur more frequently than a predetermined frequency.

10. The system of claim 1, wherein said means for minimizing inaccuracies comprises means for not permanently electrically connecting said controlled discharge means to said collecting electrode under control of said detector control means.

11. The system of claim 10, wherein said controlled discharge means uses induced conductivity in the detection medium for controlled discharge.

12. The system of claim 10, wherein said controlled discharge means uses induced conductivity in the detection medium for controlled discharge, said conductivity being induced by the radiation being measured.

13. The system of claim 12, wherein said detector control means includes means for sensing successive accumulations of charge on the collecting electrode and said controlled discharge means is connected to the means for supplying power for reversing the polarity of said electric field within said volume of gas for attracting charges of one polarity to said collecting electrode, and then attracting charges of a polarity, opposite to said first polarity, to said collecting electrode.

14. The system of claim 13, wherein said detector control means controls said controlled discharge means so that measurements can be made while said electric field is of either polarity.

15. The system of claim 1, and further comprising means within the detector control means for enabling measurement of radiation over a total dose rate range that extends beyond the range of any single unmodified radiation detection subassembly.

16. The system of claim 15, wherein said detector control means includes selecting means to select a particular radiation detection subassembly for measuring radiation within its predetermined accurate dose rate range.

17. The system of claim 15, wherein said detector control means selects a signal representative of the collected charge on one of several collecting electrodes from within a radiation detection subassembly.

18. The system of claim 1, wherein said radiation detection subassembly is capable of sensing charge or current, and further includes means for generating a numeric representation of the collected charge or current, accumulating means for accumulating a numeric representation of the sensed charge or current, and communicating means for communicating said numeric representation upon command of said detector control means, or in accordance with programmed instructions.

19. The system of claim 18, and further including means for storing numeric information used in the operation and accumulation of said numeric representation of said sensed charge or current.

20. The system of claim 19, and further comprising error detection and correction means for minimizing errors in communication of said numeric representation of said sensed charge or current.

21. The system of claim 11, and further comprising an integrated circuit; wherein said amplifying means includes at least one input transistor mounted on said integrated circuit; and wherein said integrated circuit is located in close proximity to said collecting electrode.

22. The system of claim 21, wherein an input to said amplifying means at said collecting electrode is sealed within the volume of gas and isolated from moisture, and wherein said collecting electrode is electrically isolated from elements outside of said volume of gas.

23. The system of claim 22, wherein said controlled discharge means comprises a transistor that unintentionally introduces a leakage current into the collecting electrode, said leakage current being controlled by said means for minimizing inaccuracies.

24. The system of claim 23, wherein said means for minimizing inaccuracies comprises a current source for inducing current of a polarity opposite to that of the leakage current flowing to the collecting electrode, said current source being controlled by said detector control means.

25. The system of claim 24, an d further comprising a duplicate controlled discharge means and a duplicate amplifying means, said duplicate amplifying means and said duplicate controlled discharge means being not connected to said collecting electrode, and supplying electrical signal information to said detector control mans for controlling said current source.

26. The system of claim 21, and further comprising a duplicate controlled discharge means and a duplicate amplifying means, said duplicate amplifying means and said duplicate controlled discharge means being not connected to said collecting electrode, and producing an output signal fed to said detector control means for minimizing inaccuracies due to leakage current.

27. The system of claim 21, wherein said controlled discharge means removes charge from said collecting electrode in predetermined size packets of charge, said controlled discharge means producing as output a pulse for each packet of charge removed from said collecting electrode so that the number of pulses produced as output by said controlled discharge mans is a measure of the charge collected on said collecting electrode, and the rate of said pulses is related to the current to the collecting electrode.

28. The system of claim 27, and further comprising a voltage source, and wherein said controlled discharge means comprises two transistors connected in series between said collecting electrode and said voltage source, said transistors being controlled and switched sequentially so that only one transistor conducts at any one instant in time for removing predetermined size packets of charge from the collecting electrode and delivering said charge to said voltage source.

29. The system of claim 27, and further comprising counting means forming a part of said detector control means for counting events corresponding to the removal of charge by said controlled discharge means, and wherein said means for minimizing inaccuracies comprises means for controlling said counting means to ignore charge removal events if said charge removal events do not occur more frequently than a predetermined frequency.

30. The system of claim 21, wherein said means for minimizing inaccuracies comprises means for not permanently electrically connecting said controlled discharge means to said collecting electrode under control of said detector control means.

31. The system of claim 30, wherein said controlled discharge means uses induced conductivity in the detection medium for controlled discharge.

32. The system of claim 30, wherein said controlled discharge means uses induced conductivity in the detection medium for controlled discharge, said conductivity being induced by the radiation being measured.

33. The system of claim 32, wherein said detector control means includes means for sensing successive accumulations of charge on the collecting electrode and said controlled discharge means is connected to the means for supplying power for reversing the polarity of said electric field within said volume of gas for attracting charges of one polarity to said collecting electrode, and then attracting charges of a polarity, opposite to said first polarity, to said collecting electrode.

34. The system of claim 33, wherein said detector control means controls said controlled discharge means so that measurements can be made while said electric field is of either polarity.

35. The system of claim 21, and further comprising means within the detector control means for enabling measurement of radiation over a total dose rate range that extends beyond the range of any single unmodified radiation detection subassembly.

36. The system of claim 35, wherein said detector control means includes selecting means to select a particular radiation detection subassembly for measuring radiation within its predetermined accurate dose rate range.

37. The system of claim 35, wherein said detector control means selects a signal representative of the collected charge on one of several collecting electrodes from within a radiation detection subassembly.

38. The system of claim 21, and further comprising a guard ring mounted on the surface of said integrated circuit, said guard ring being kept at the same potential as said collecting electrode to intercept leakage current to said collecting electrode.

39. The system of claim 38, wherein said guard ring is sized to minimize induction of voltage onto said collecting electrode due to the presence of nearby conductive material on said integrated circuit.

40. The system of claim 38, and further comprising a capacitor formed on the integrated circuit connected to the gate of said input transistor for controllably changing the voltage of the gate without inducing a leakage current.

41. The system of claim 21, wherein said radiation detection subassembly is capable of sensing charge or current, and further includes means for generating a numeric representation of the collected charge or current, accumulating means for accumulating a numeric representation of the sensed charge or current, and communicating means for communicating said numeric representation upon command of said detector control means, or in accordance with programmed instructions.

42. The system of claim 41, and further including means for storing numeric information used in the operation and accumulation of said numeric representation of said sensed charge or current.

43. The system of claim 42, and further comprising error detection and correction means for minimizing errors in communication of said numeric representation of said sensed charge or current.

44. The system of claim 1, and further comprising an unpackaged integrated circuit; wherein said surface element in mounted on said unpackaged integrated circuit; and wherein said amplifying means includes an input transistor mounted on said integrated circuit.

45. The system of claim 44, wherein an input to said amplifying means at said collecting electrode is sealed within the volume of gas and isolated from moisture, and said collecting electrode is electrically isolated from elements outside of said volume of gas.

46. The system of claim 44, wherein said controlled discharge means comprises a transistor that unintentionally introduces a leakage current into the collecting electrode, said leakage current being controlled by said means for minimizing inaccuracies.

47. The system of claim 46, wherein said means for minimizing inaccuracies comprises a current source for inducing current of opposite polarity than the leakage current to flow to the collecting electrode, said current source being controlled by the detector control means.

48. The system of claim 47, and further comprising a duplicate controlled discharge means and a duplicate amplifying means, said duplicate amplifying means and said duplicate controlled discharge means not being connected to said collecting electrode, said duplicate controlled discharge means and duplicate amplifying means supplying electrical signal information to said detector control mans for controlling said current source.

49. The system of claim 44, and further comprising a duplicate controlled discharge means and a duplicate amplifying means, said duplicate amplifying means and said duplicate controlled discharge being not connected to said collecting electrode, and producing an output signal fed to said detector controller means for minimizing inaccuracies due to the leakage current.

50. The system of claim 44, wherein said controlled discharge means removes charge from said collecting electrode in predetermined size packets of charge, said controlled discharge means producing as output a pulse for each packet of charge removed from said collecting electrode so that the number of pulses produced as output by said controlled discharge means is a measure of the charge collected on said collecting electrode, and the rate of said pulses is related to the current to the collecting electrode.

51. The system of claim 50, and further comprising a voltage source; and wherein said controlled discharge means comprises two transistors connected in series between said collecting electrode and said voltage source, said transistors being controlled and switched sequentially so that only one transistor conducts at any one instant in time for removing predetermined size packets of charge from the collecting electrode and delivering said charge to said voltage source.

52. The system of claim 50, and further comprising counting means forming a part of said detector control means for counting events corresponding to the removal of charge by said controlled discharge means, and wherein said means for minimizing inaccuracies comprises means for controlling said counting means to ignore charge removal events if said charge removal events do not occur greater than a predetermined frequency.

53. The system of claim 44, wherein said means for minimizing inaccuracies comprises means for not permanently electrically connecting said controlled discharge means to said collecting electrode under control of said detector control means.

54. The system of claim 53, wherein said controlled discharge means uses induced conductivity in the detection medium for controlled discharge.

55. The system of claim 53, wherein said controlled discharge means uses induced conductivity in the detection medium for controlled discharge, said conductivity being induced by the radiation being measured.

56. The system of claim 55, wherein said detector control means includes means for sensing successive accumulations of charge on the collecting electrode and said controlled discharge means is connected to the means for supplying power for reversing the polarity of said electric field within said volume of gas for attracting charges of one polarity to said collecting electrode, and then attracting charges of a polarity, opposite to said first polarity, to said collecting electrode.

57. The system of claim 56, wherein said detector control mans controls said controlled discharge means so that measurements can be made while said electric field is of either polarity.

58. The system of claim 44, and further comprising means within the detector control means for enabling measurement of radiation over a total dose rate range that extends beyond the range of any single unmodified radiation detection subassembly.

59. The system of claim 58, wherein said detector control means includes selecting means to select a particular radiation detection subassembly for measuring radiation within its predetermined accurate dose rate range.

60. The system of claim 58, wherein said detector control means selects a signal representative of the collected charge on one of several collecting electrode from within a radiation detection subassembly.

61. The system of claim 44, and further comprising a guard ring mounted on the surface of said integrated circuit, said guard ring being kept at the same potential as said collecting electrode to intercept leakage current to said collecting electrode.

62. The system of claim 61, wherein said guard ring is sized to minimize induction of voltage onto said collecting electrode due to the presence of nearby conductive material on said integrated circuit.

63. The system of claim 61, and further comprising a capacitor formed on the integrated circuit connected to the gate of said input transistor for controllably changing the voltage of the gate without inducing a leakage current.

64. The system of claim 44, wherein said radiation detection subassembly is capable of sensing charge or current, and further includes means for generating a numeric representation of the collected charge or current, accumulating means for accumulating a numeric representation of the sensed charge or current, and communicating means for communicating said numeric representation upon command of said detector control means, or in accordance with programmed instructions.

65. The system of claim 64, and further including means for storing numeric information used in the operation and accumulation of said numeric representation of said sensed charge or current.

66. The system of claim 65, and further comprising error detection and correction means for minimizing errors in communication of said numeric representation of said sensed charge or current.

* * * * *